US010684215B2

(12) United States Patent
Birks et al.

(10) Patent No.: US 10,684,215 B2
(45) Date of Patent: Jun. 16, 2020

(54) METHOD FOR MEASURING AIR POLLUTANTS USING A FOLDED TUBULAR PHOTOMETER

(71) Applicant: Ludlum Measurements, Inc., Sweetwater, TX (US)

(72) Inventors: John William Birks, Longmont, CO (US); Peter Christian Andersen, Superior, CO (US); Andrew Allen Turnipseed, Arvada, CO (US); Craig Joseph Williford, Golden, CO (US)

(73) Assignee: LUDLUM MEASUREMENTS, INC., Sweetwater, TX (US)

( * ) Notice: Subject to any disclaimer, the term of this patent is extended or adjusted under 35 U.S.C. 154(b) by 408 days.

(21) Appl. No.: 15/880,244

(22) Filed: Jan. 25, 2018

(65) Prior Publication Data

US 2019/0226987 A1    Jul. 25, 2019

(51) Int. Cl.
    *G01N 21/03*    (2006.01)
    *G01N 21/59*    (2006.01)
    (Continued)

(52) U.S. Cl.
    CPC .......... *G01N 21/031* (2013.01); *G01N 15/06* (2013.01); *G01N 21/31* (2013.01); *G01N 21/33* (2013.01);
    (Continued)

(58) Field of Classification Search
    CPC .... G01N 21/5907; G01N 21/31; G01N 15/06; G01N 21/031; G01N 21/49; G01N 21/33;
    (Continued)

(56) References Cited

U.S. PATENT DOCUMENTS

| 6,100,096 A | 8/2000 | Bollinger et al. |
| 6,635,415 B1 | 10/2003 | Bollinger et al. |

(Continued)

OTHER PUBLICATIONS

Arnott, W. P., K Hamasha, H. Moosmüller, P. J. Sheridan, and J. A. Ogren (2005) "Towards aerosol light-absorption measurements with a 7-wavelength aethalometer: Evaluation with a photoacoustic instrument and 3-wavelength nephelometer," Aerosols Science and Technology 39, 17-29. 13 pages.

(Continued)

*Primary Examiner* — Benjamin R Schmitt
(74) *Attorney, Agent, or Firm* — Polson Intellectual Property Law, PC; Margaret Polson; Christopher Sylvain

(57) ABSTRACT

The present invention makes use of a modular Folded Tubular Photometer to measure the concentrations of gas-phase species and/or particles, including especially air pollutants such as ozone ($O_3$), nitrogen dioxide ($NO_2$), sulfur dioxide ($SO_2$) and black carbon particulate matter, by means of absorbance of ultraviolet (UV), visible or infrared (IR) light. The optical bench makes use of modular components (tubes and mirror assemblies) that allow construction of path lengths of up to 2 meters or more while maintaining low detection cell volumes. The long path lengths, low cell volumes, and the innovation of pressure equalization during the absorbance measurements enable sensitive detection of ambient air pollutants down to low part-per-billion levels or less for gas species, and extinctions down to 1 $Mm^{-1}$ or less for particulate matter, corresponding to ~0.13 $\mu g/m^3$ or less for black carbon particulates.

20 Claims, 11 Drawing Sheets

(51) Int. Cl.
  G01N 21/49    (2006.01)
  G01N 21/33    (2006.01)
  G01N 21/3504  (2014.01)
  G01N 21/31    (2006.01)
  G01N 15/06    (2006.01)
  G01N 21/359   (2014.01)
  G01N 15/00    (2006.01)

(52) U.S. Cl.
  CPC ......... *G01N 21/3504* (2013.01); *G01N 21/49* (2013.01); *G01N 21/5907* (2013.01); *G01N 21/359* (2013.01); *G01N 2015/0046* (2013.01); *G01N 2015/0693* (2013.01); *G01N 2021/3181* (2013.01); *G01N 2201/0668* (2013.01)

(58) Field of Classification Search
  CPC ....... G01N 21/3504; G01N 2015/0693; G01N 21/359; G01N 2015/0046; G01N 2021/3181; G01N 2201/0668; G01N 1/2205
  USPC .............. 73/23.35, 23.4, 23.41, 23.42, 31.05
  See application file for complete search history.

(56) References Cited

U.S. PATENT DOCUMENTS

| | | |
|---|---|---|
| 7,045,359 B2 | 5/2006 | Birks et al. |
| 7,238,328 B2 | 7/2007 | Buhr |
| 8,395,776 B2 | 3/2013 | Birks et al. |
| 9,423,340 B2 | 8/2016 | Birks et al. |
| 2009/0302230 A1 | 12/2009 | Birks et al. |
| 2010/0108489 A1 | 5/2010 | Andersen et al. |
| 2016/0025696 A1 | 1/2016 | Birks et al. |

OTHER PUBLICATIONS

Baumgardner, D., O. Popovicheva, J. Allan, V. Bernardoni, J. Cao, F. Cavalli, J. Cozic, E. Diapouli, K. Eleftheriadis, P. J. Genberg, C. Gonzalez, M. Gysel, A. John, T. W. Kirchstetter, T. A. J. Kuhlbusch, M. Laborde, D. Lack, T. Müller, R. Niessner, A. Petzold, A. Piazzalunga, J. P. Putaud, J. Schwarz, P. Sheridan, R. Subramanian, E. Swietlicki, G. Valli, R. Vecchi, and M. Viana (2012) "Soot reference materials for instrument calibration and intercomparisons: A workshop summary with recommendations," Atmospheric Measurement Techniques 5, 1869-1887. 19 pages.
Birks, J. W., B. Shoemaker, T. J. Leck, and D. M. Hinton (1976) "Studies of reactions of importance in the stratosphere. I. Reaction of nitric oxide with ozone," Journal of Chemical Physics 65, 5181-5185. 5 pages.
Birks, J. W. (1998) "Oxidant formation in the troposphere," In Perspectives in Environmental Chemistry, D. L. Macalady, Ed., Oxford University Press, pp. 233-256 (1998). 24 pages.
Bond, T. and R. W. Bergstrom (2006) "Light Absorption by carbonaceous particles: An investigative review," Aerosol Science and Technology 40, 27-67. 42 pages.
Borders, R. A. and J. W. Birks (1982) "High precision measurements of activation energies over small temperature intervals: Curvature in the Arrhenius plot for the reaction NO + O3 □ NO2 + O2," Journal of Physical Chemistry 86, 3295-3302. 8 pages.
Burkholder, J. B., S. P. Sander, J. Abbatt, J. R. Barker, R. E. Huie, C. E. Kolb, M. J. Kurylo, V. L. Orkin, D. Wilmouth, and P. H. Wine: Chemical Kinetics and Photochemical Data for Use in Atmospheric Studies, Evaluation No. 18, JPL Publication 15-10, Jet Propulsion Laboratory, Pasadena, 2015. 1,392 pages.
Burrows, J. P., A. Dehn, B. Deters, S. Himmelmann, A. Richter, S. Voigt, and J. Orphal, (1998) "Atmospheric remote-sensing reference data from GOME: Part 1. Temperature-dependent absorption cross-sections of NO2 in the 231-794 nm range," Journal of Quantitative Spectroscopy and Radiative Transfer 60, 1025-1031. 7 pages.
Coen, M. C., E. Weingartner, A. Apituley, D. Ceburnis, R. Fierz-Schmidhauser, H. Flentje, J. S. Henzing, S. G. Jennings, M. Moerman, A. Petzold, O. Schmid, and U. Baltensperger (2010) "Minimizing light absorption measurement artifacts of the Aethalometer: Evaluation of five correction algorithms," Atmospheric Measurement Techniques 3, 457-474. 18 pages.
Daube, B. C., A. E. Boering, A. E. Andrews, and S. C. Wofsy (2002) "A high-precision fast response airborne CO2 analyzer for in situ sampling from the surface to the middle stratosphere," Journal of Atmospheric and Oceanic Technology 19, 1532-1543. 12 pages.
Fontijn, A., A. J. Sabadell, and R. J. Ronco (1970) "Homogenous chemiluminescent measurement of nitric oxide with ozone," Analytical Chemistry 42, 575-579. 5 pages.
Hansen, A. D. A., H. Rosen, and T. Novakov (1982) "Real-time measurement of the aerosol absorption-coefficient of aerosol particles," Applied Optics 21, 3060-3062. 3 pages.
Herriott, D. and H. Schulte (1965) "Folded optical delay lines," Applied Optics 4, 883-889. 7 pages.
Janssen, N. A. H., M. E. Gerlos-Nijland, T. Lanki, R. O. Salonen, F. Cassee, G. Hoek, P. Fischer, B. Brunekreef, and M. Krzyzanowski (2012) Health Effects of Black Carbon, World Health Organization Regional Office for Europe. 96 pages.
Kalnajs, L. E. and L.M. Avallone (2010) "A novel lightweight low-power dual-beam ozone photometer utilizing solid-state optoelectronics," Journal of Atmospheric and Oceanic Technology 27, 869-880. 12 pages.
Kebabian, P. L., S. C. Herndon, and A. Freedman (2005) "Detection of nitrogen dioxide by cavity attenuated phase shift spectroscopy," Analytical Chemistry 77, 724-728. 5 pages.
Ramanathan, V. (2007) Testimony for the Hearing on Black Carbon and Climate Change, U.S. House Committee on Oversight and Government Reform 4, Oct. 18, 2007. 17 pages.
Schwarz, F. P., H. Okabe, and J. K. Whittaker (1974) "Fluorescence detection of sulfur dioxide in air at the parts per billion level," Analytical Chemistry 46, 1024-1028. 5 pages.
Vandaele, A. C., P. C. Simon, J. M. Guilmot, M. Carleer, and R. Colin (1994) "SO2 absorption cross section measurement in the UV using a Fourier transform spectrometer," Journal of Geophysical Research 99, 25599-25605. 7 pages.
Weingartner, E., H. Saathoff, M. Schnaiter, N. Streit, B. Bitnar, and U. Baltensperger (2003) "Absorption of light by soot particles: Determination of the absorption coefficients by means of aethalometers," Journal of Aerosol Science 34, 1445-1463. 19 pages.
White, J. U. (1942) "Long optical paths of large aperture," Journal of the Optical Society of America 32, 285-288. 4 pages.
Wilson, K. L. and J. W. Birks, Mechanism and elimination of a water vapor interference in the measurement of ozone by UV absorbance (2006) Environmental Science and Technology 40, 6361-6367. 7 pages.
Winer, A. M., J. W. Peters, J. P. Smith, and J. N. Pitts (1974) Response of commercial chemiluminescent NO—NO2 analyzers to other nitrogen-containing compounds, Environmental Science and Technology 8, 1118-1121. 4 pages.
2B Technologies, Inc., NO2/NO/NOx Monitor Model 405 nm Operation Manual, Revision D (Jun. 2016). 53 pages.
2B Technologies, Inc., NO2/NO/NOx Monitor Model 405 nm Operation Manual, Revision E (Feb. 2017). 53 pages.

a. Measure $I_o$ for $NO_2$ b. Measure $I$ for $NO_2$ and $I_o$ for NO c. Measure $I$ for NO

METHOD FOR MEASURING AIR POLLUTANTS USING A FOLDED TUBULAR PHOTOMETER

BACKGROUND

Air pollutants such as ozone ($O_3$), nitrogen dioxide ($NO_2$), sulfur dioxide ($SO_2$) and black carbon are monitored at thousands of locations around the world because of their adverse health effects and contributions to climate change. Of these, $O_3$, $NO_2$ and $SO_2$ have been designated "Criteria Pollutants" in the U.S. with limits on their ambient concentrations regulated by the Environmental Protection Agency (EPA). Concentrations of these pollutants are regulated by many other countries as well. Black carbon is the carbonaceous or "soot" component of particulate matter (PM) and specifically $PM_{2.5}$, defined as the mass per unit volume of all particles having diameters of 2.5 µm or less, which is another US EPA Criteria Pollutant. Black carbon is currently of great interest as an air pollutant because of both its adverse health effects and its contribution to climate change. For example, it has been estimated that 20% of global warming and 40% of glacier melting to date is due to black carbon, making it second only to $CO_2$ as a driver of global climate change (Ramanathan, 2007). Because of their small size (freshly emitted particles are less than 0.1 µm), black carbon particles penetrate deep into lungs and contribute to a wide range of health problems, including asthma, and most likely cardiovascular disease and lung cancer (Janssen et al., 2012). Sulfur dioxide is a primary pollutant emitted to the atmosphere as a result of combustion of fossil fuels, especially coal. Nitrogen dioxide is formed in the atmosphere by the oxidation of nitric oxide (NO), which is produced in high temperature combustion of fuels such as internal combustion engines. $NO_2$ also is emitted directly to the atmosphere from combustion processes, especially by diesel engines that also tend to produce high concentrations of black carbon. Since the 1950s it has been known that ozone is a secondary pollutant formed in the interaction of sunlight with volatile organic compounds (VOCs) and oxides of nitrogen ($NO_x$=$NO$+$NO_2$). In photochemical smog, ozone is formed in the $NO_x$-sensitized oxidation of hydrocarbons where $NO_x$ serves as a photocatalyst (e.g., Birks, 1998). Ozone is not only damaging to human health, crops and natural ecosystems, it is also a significant greenhouse gas. Thus, as a result of the human health and climate impacts of these air pollutants, measurements of $O_3$, $NO_2$, $SO_2$ and black carbon are needed now and will be needed far into the future. A new method based on direct long path absorbance for measurements of all of these chemical species is disclosed herein, with an emphasis on measurements of $NO_2$, $SO_2$ and black carbon, where significant improvements over existing methodologies are most needed.

Ozone, $NO_2$, $SO_2$ and black carbon all absorb at ultraviolet or visible wavelengths, and their concentrations can be measured by optical absorbance. Light absorbance is governed by the Beer-Lambert Law:

$$\frac{[I]}{[I_o]} = e^{-\sigma l c} \text{ or } c = \frac{1}{\sigma l}\ln\left(\frac{I_o}{I}\right) \tag{1}$$

where $I_o$ is the light intensity passing through the detection cell with no analyte (e.g., $O_3$ $NO_2$, $SO_2$, black carbon) present, I is the intensity of light passing through the detection cell when the analyte is present, σ is the extinction coefficient for the analyte (absorption cross section in $cm^2$ $molec^{-1}$ for gases; mass extinction coefficient in $m^2$ $g^{-1}$ for particulates), l is the path length through the detection cell (cm), and c is the concentration of analyte within the detection cell (molec $cm^{-3}$ for gases; µg $m^{-3}$ for particulates). The analyte concentration is often converted to a mixing ratio such as parts-per-million by volume (ppm) or parts-per-billion by volume (ppb) by dividing by the total concentration of air molecules and multiplying by the appropriate factor ($10^6$ for ppm and $10^9$ for ppb). The total concentration of air molecules is usually determined by measuring the temperature and pressure within the detection cell and using the ideal gas law. Light absorbance is an especially attractive technique, since it relies only on knowing σ, which is an intrinsic property of the molecule; the path length, which is easily measured; and the ability to measure relative light intensities.

The most common method for measuring ozone is by absorbance of the 253.7 nm emission line of a low-pressure mercury lamp. The absorbance, $\ln(I_o/I)$, can be measured in modern photometers with a precision (standard deviation of the noise or RMS noise) of typically ~$3\times10^{-6}$ for 10-second averaging times. Combining this with the ozone absorption cross section and optical path length determines the overall precision expected for a measurement of a given analyte at ambient temperature and pressure:

$$\text{Precision}(ppb) = \frac{3\times10^{-6}}{\sigma l (P/kT)} \times 10^9 \tag{2}$$

Here, σ is the absorption cross section, P is the total pressure, k is the Boltzmann constant, T is the absolute temperature, and the factor of $10^9$ converts the mole fraction to parts-per-billion by volume (ppb). The absorption cross section for ozone is $1.15\times10^{-17}$ $cm^2$/molec, and the value of P/kT (the total concentration of gas molecules) is $2.46\times10^{19}$ molec/$cm^3$ at 1 atm of pressure and temperature of 25° C. For ozone, the precision is calculated to be 0.7 ppb for a path length of 15 cm and 0.35 ppb for a path length of 30 cm, in good agreement with the performance of commercial ozone monitors currently on the market.

The air pollutants $NO_2$, $SO_2$ and black carbon absorb much less strongly than ozone, with absorption cross sections being ~$6\times10^{-19}$ $cm^2$/molec for $NO_2$ (Burrows et al., 1998) at 405 nm and ~$7\times10^{-19}$ $cm^2$/molec for $SO_2$ at 290 nm (Vandaele et al., 1994). Rearranging equation 2, it may be calculated that to obtain a precision of 1 ppb for $NO_2$ would require a path length of ~203 cm and for $SO_2$ would require a path length of ~174 cm.

Mass extinction coefficients for particulate matter are commonly expressed in units of $m^2$/g. The mass extinction coefficient for black carbon, a form of particulate matter, depends on size distribution and other physical properties, and is typically cited to be in the range 5-20 $m^2$/g at 880 nm with a recommended value of 7.7 $m^2$/g (Bond and Bergstrom, 2006). Assuming this extinction coefficient and again assuming the precision in the measurement of absorbance to be $3\times10^{-6}$ for 10-s averaging times, a path length of 3.9 m (390 cm) would be required to obtain a precision of 0.1 µg/$m^3$ for black carbon mass concentration, calculated as $3\times10^{-6}/(7.7$ $m^2/g\times0.1$ µg/$m^3\times10^{-6}$ g/µg). Data averaging can be used to further improve the precision, and that improvement can be traded for a shorter path length. For example, averaging for 1 minute (six 10-s measurements) typically will improve the precision by a factor of $\sqrt{5}$ or 2.24, allowing the path length to be reduced to 174 cm for the measurement of black carbon with a precision of better than 0.1 µg/m$^3$.

Because of the long path lengths required, calculated above to be 1.7-3.9 meters to obtain necessary measurement precisions for 10-s averaging, the pollutants $NO_2$, $SO_2$ and black carbon are seldom measured by direct absorbance in the gas phase. The most common method to measure $NO_2$ has long been reduction to NO, usually by passing through a heated molybdenum catalyst bed (Winer et al., 1974), followed by detection of its chemiluminescence with ozone at reduced pressure (Fontijn et al., 1970). A more recent method makes use of photolytic conversion of $NO_2$ to NO with blue light near 405 nm (Buhr, 2007). A major disadvantage of the chemiluminescence method is that the conversion efficiency is not typically 100% and varies with time. In the case of the molybdenum converter, other nitrogen species in the atmosphere, especially peroxyacetylnitrates (PANs), $N_2O_5$ and nitric acid ($HNO_3$), may be converted as well (Winer et al., 1974). The photolytic conversion method is less efficient (typically ~50%) due to a photochemical equilibrium established within the photoreactor between NO, $NO_2$ and $O_3$, and, as a result, the conversion efficiency depends on the ambient concentration of ozone. Furthermore, regardless of the conversion method, the measurement of $NO_2$ is indirect, being calculated from the difference between measurements of $NO_x$ ($NO_2$+NO) obtained by passing through the converter and measurements of NO without passing through the converter.

Sulfur dioxide has typically been measured by fluorescence (Schwarz et al., 1974). However, absorbance has the advantage of being an absolute method, requiring no or only infrequent calibration. As noted earlier, for absorbance measurements, only relative light intensities need to be measured since the Beer-Lambert Law requires only the ratio of light intensities, I/I, in order to calculate the analyte concentration from the absorption cross section and easily known path length. Instruments based on absorbance are typically less expensive to construct than fluorescence-based instruments and require less power because a high intensity light source is not required. Thus, an instrument based on direct absorbance of $SO_2$ would have advantages over fluorescence, at least in those applications where it provides adequate sensitivity. One example is smokestack monitoring for $SO_2$ emissions in the combustion of fossil fuels such as coal or natural gas, where a more robust instrument requiring little maintenance and infrequent calibration is desirable.

Black carbon has long been measured by the method of aethalometry developed in the early 1980s, whereby particulate matter is continuously deposited on a filter and transmission of light through the filter is continuously measured (Hansen et al., 1982). However, aethalometers have been demonstrated over the past few years to have several artefacts associated with the requirement that particles be pre-concentrated by continuous collection on a filter tape (Weingartner et al., 2003; Arnott et al., 2005; Baumgardner et al., 2012). Light scattering within the filter matrix increases the extinction by a variable factor of ~2, and co-deposited particles of other types increase light scattering as well. Also, the agglomeration of particles within the filter changes their fundamental optical properties. Thus, it is highly desirable to measure black carbon by direct absorbance in the gas phase without pre-concentration on a filter medium.

Several approaches to the development of instruments for long path absorption measurements of species in the gas phase have been taken in the past. By use of mirrors, the path can be folded within a detection cell with up to 100 or more reflections, thus greatly increasing the absorption path length. Of these, the White cell has been one of the most successful and can be applied to both collimated and uncollimated light beams (White, 1942). A disadvantage of this approach, however, is that even the miniaturized versions of White cells have relatively large volumes, typically 180 cm$^3$ and larger, so that the flush times for typical flow rates of 1.8 L/min (30 cm$^3$/s) are long. Also, the cell shapes required by the mirror arrangements necessitate multiple flush times. Assuming exponential dilution, a detection cell requires ~4.6 flush times to exchange 99% of its contents. Thus, for a cell volume of 180 cm$^3$ (volume of a currently commercially-available miniature White cell with 2-meter path length) and flow rate of 30 cm$^3$/s, the total required flush time is 4.6×180/30=27.6 s. In order to obtain the low absorbance precisions of 3×10$^{-6}$ stated earlier, it is important to measure the reference light intensity ($I_o$) every 5 to 10 seconds due to small intensity drifts in typical light sources. This requires total cell flushing times of 2.5 to 5 seconds (to measure both I and $I_o$), which is incompatible with the miniature White cell described above unless excessively large flow rates (>10 L/min) are used. However, large flow rates are impractical because of the size, weight and power consumption of the air pump required, and the large scrubber capacity necessary to quantitatively remove the analyte from such a large flow rate for the reference measurement. For this reason, typical flow rates used in commercially-available air pollution monitors are in the range 0.5-3 L/min.

Herriott cells (Herriott and Schulte, 1965) may be used to achieve very long path lengths of 50 m or more for absorbance measurements, and although low volume Herriott cells have been demonstrated, they require a laser as a light source to achieve the required degree of collimation. Unfortunately, the advantage in sensitivity gained by the longer path lengths achievable using Herriott cells are largely offset by the greater noise of a laser light source as compared to uncollimated sources, such as light emitting diodes or low-pressure mercury lamps that can be used with White cells.

Accordingly, 2B Technologies, Inc. developed another approach, a so-called "Folded Tubular Photometer" (e.g., 2B Technologies, Inc.'s Model 405 nm $NO_2$/NO/$NO_x$ Monitor), for measurements of a pollutant or other species in a gas such as air. This type of device uses modular mirror cubes in combination with modular tubular detection cells, which allow the light path to be folded and make it compact enough for a several-meters-long detection cell to fit into a conventional rack-mount-sized or smaller enclosure (rack-mount is a common term in the art meaning the equipment will fit in a conventional electronic rolling rack having 19-in wide slots). Further, this approach makes it possible to reduce the cell volume and therefore also the flush times significantly, compared with the White cell described above. Typically, tubular detection cells were used with a 3/16 in (0.476 cm) inner diameter (i.d.) such that a 2-m long path length has a calculated volume of only ~35.6 cm$^3$. Thus, the time for one flush at a flow rate of 1.8 L/min (30 cm$^3$/s) is only 35.6/30=1.2 s. The time for a molecule to diffuse across the inner diameter of the tubular detection cell is calculated to be ~0.5 s, and therefore, nearly plug flow results and only one or two flush times are required to achieve greater than 99% complete flushing of the previous contents of the detection volume. This allows a new I or $I_o$ measurement to be made once every 5 s or less, and because those measurements are made close together in time, variations in the lamp intensity between measurements is small. As a result, higher precision can be achieved than in a White or Herriott cell of the same path length. With Folded Tubular Photometers, measurements of ambient concentrations of $NO_2$, $SO_2$ and black carbon by direct absorbance in the gas phase thus become feasible.

In addition to increasing precision by allowing measurements of I and $I_o$ close in time, the low-volume Folded Tubular Photometer allows rapid measurements of both $NO_2$ and NO within the same instrument and temporally separated by only a few seconds. NO is measured by addition of ozone to convert NO to $NO_2$ with near 100% conversion by the reaction:

$$NO + O_3 \rightarrow NO_2 + O_2 \qquad (3)$$

Subsequent measurement of the increase in $NO_2$ concentration upon addition of ozone provides a highly accurate measurement of NO. Alternative commercially-available methods based on absorbance such as cavity attenuated phase shift spectroscopy (CAPS) (Kebabian et al., 2005) measure $NO_2$ but not NO, most likely because a large cavity (detection cell) is required that cannot be rapidly flushed with the practical flow rates of 1-3 L/min employed.

However, in attempting to use such low-volume, long-path tubular detection cells, including with the light beam folded using mirrors or unfolded, substantial errors were consistently encountered in the concentration of analytes determined from the I and $I_o$ measurements compared to known values of the sample gas. For example, an error of ~50 ppb was typically found in the measurement of $NO_2$ at a flow rate of ~1.8 L/min through a Folded Tubular Photometer having a path length of ~2 m and cell volume ~35.6 $cm^3$. Therefore, despite the expected benefits of the Folded Tubular Photometer over the state of the art discussed above, the measurement errors obtained rendered this approach unacceptable for applications requiring accurate measurements of pollutants in a sample gas.

The foregoing examples of the related art and limitations therewith are intended to be illustrative and not necessarily exclusive. Other limitations of the related art will become apparent to those of skill in the art upon a reading of the specification and a study of the drawings.

SUMMARY

Proceeding from this background, it was unexpectedly discovered that the transmission of light through low-volume, long-path folded tubular detection cells (Folded Tubular Photometers), and therefore the detected light intensity used to calculate analyte concentrations, was dependent on pressure. This previously-unknown problem was encountered after developing a long-path tubular photometer for measuring air pollutants, such as $O_3$, $NO_2$, $SO_2$ and black carbon, and then observing substantial errors in the measurements. In a Folded Tubular Photometer, the pressure in the detection/absorption cell during measurement of the analytical intensity I is higher than the pressure observed during measurement of the reference intensity $I_o$, because of the flow restriction caused by the analyte scrubber or filter when the sample gas flow is first directed through the analyte scrubber or filter before entering the cell for $I_o$ measurement. However, while the existence of this pressure difference was known, the effect of the pressure difference on long-path photometer measurement accuracy was neither previously known nor predicted. This pressure effect on light transmission usually manifests as a large negative physical interference, often amounting to an error of tens of ppb equivalent or more of the analyte being quantified. To illustrate, the pressure difference resulting from flowing a sample gas directly into the cell during the measurement of I versus flowing the sample gas first through an analyte scrubber during the measurement of $I_o$ (e.g., $NO_2$ scrubber when measuring $NO_2$) at a flow rate of ~1.8 L/min was found typically to be ~10 mbar. This pressure difference alone would cause an unacceptable error of typically ~50 ppb in the measurement of $NO_2$ due to measured differences of $I_o$ and I.

The magnitude of this pressure dependence of light transmission in a Folded Tubular Photometer was unpredicted, unexpected and not previously reported or otherwise identified in the art. Further, it is not easily explained by any existing theory. For example, the pressure effect cannot be accounted for by differences in Rayleigh scattering by air molecules at different densities. The Rayleigh scattering cross section in air is ~$10^{-27}$ $cm^2$/molec at 532 nm. For a path length of 200 cm, 1 atmosphere of pressure, and temperature of 25° C., this corresponds to an extinction, $\ln(I_o/I)$, of only $5 \times 10^{-6}$, and a 10-mbar pressure change would cause an extinction change of only ~$5 \times 10^{-8}$, or about two orders of magnitude below the limit of detection for absorbance measurements. The effect could possibly be due to the efficiency of propagation of a non-collimated beam of light passing through the photometer by reflection from the photometer's internal surfaces used to fold the path, a process that depends on the refractive indices of the sample gas (which depend on pressure) and the tubular cell walls and/or mirror surfaces. The effect could also be due to changes in the amount of adsorbed water on the interior surfaces of the photometer that is in equilibrium with water vapor in the gas phase, the concentration of which changes with cell pressure. Further, the observed pressure effect might possibly be due to subtle changes in the optical alignment with the pressure change within the photometer. Or it could result from any combination of these reasons or from some as yet unknown factor.

That it was previously unknown that the transmission of uncollimated light through a tubular photometer has a pressure dependence is likely due to the lack of previous attempts to build a long-path tubular photometer such as the one described here. Also, the effect would likely be overlooked in other applications due to observed very small changes in transmitted light intensity, which in most instances would be viewed as insignificant. Those small changes were discovered here, however, because such very small differences in light intensity correspond to low but relevant analyte concentrations (e.g., a few parts in a million change in light intensity typically corresponding to one ppb of analyte in examples given above) when using a long path tubular photometer for absorbance measurements.

Regardless of the cause of the pressure effect on light transmission through a long path tubular photometer, it was found that adjusting the pressure to be identical or nearly so, typically to within ±0.1 mbar between measurements of the light intensities $I_o$ and I, improves the analyte measurement accuracy to within acceptable levels (e.g., to better than ±1 ppb for measurements of $NO_2$). Therefore, continuous pressure equalization during measures of $I_o$ and I is critical for accurate measurements of analyte concentrations such as $NO_2$, $SO_2$ and black carbon.

Accordingly, the present disclosure relates to a method for accurately measuring analyte concentrations in a sample gas via light absorption through a low-volume, long-path folded tubular detection cell (Folded Tubular Photometer). One aspect of the present disclosure is to precisely measure low concentrations of the pollutants $NO_2$, $SO_2$ or black carbon in a sample gas. Another aspect of the present disclosure is to measure a pollutant or other analyte in air or another gas by direct absorbance within a narrow range of wavelengths of ultraviolet (UV), visible, or infrared (IR) light that are selectively absorbed by that analyte. Another aspect of the present disclosure is referencing light intensity measurements with the analyte present (I) in the sample gas to those of the analyte selectively scrubbed ($I_o$) from the sample gas. Another aspect of the present disclosure is the use of an inexpensive, non-collimated light source with low noise such as a light emitting diode (LED) for the absorbance measurement, although collimated sources such as diode lasers may also be utilized if desired. Another aspect of the present disclosure is the use of a long absorbance path length, thereby making it possible to accurately measure a pollutant or other analyte including in low concentrations (e.g., low ppb and below for gases; low $\mu g/m^3$ and below for particulates such as black carbon) which may be relevant to human health effects and/or regulated by environmental agencies. Another aspect of the present disclosure is the use of mirrors to fold the light path through a tubular arrangement to reduce space requirements, although other reflective elements could be utilized if desired. Another aspect of the present disclosure is to use a modular construction of mirror and tubular components, thereby allowing the absorption path length of to be adjusted and optimized for specific analytes and concentration ranges. Another aspect of the present disclosure is the use of a low-volume Folded Tubular Photometer to reduce the flush times at practical flow rates of the sample gas, thereby allowing reference measurements ($I_o$) to be made close in time to analytical measurements (I). A critical aspect of the present disclosure is to equalize or substantially match the pressures within the tubular detection cells during the measurement of light intensities in both the presence (I) and absence ($I_o$) of analyte in the sample gas flow, thereby eliminating potentially large and unacceptable errors in the calculated analyte concentration and thus permitting the realization of other aspects and benefits of the present disclosure from a practical perspective.

The following embodiments and aspects thereof are described and illustrated in conjunction with systems, tools and methods that are meant to be exemplary and illustrative, not limiting in scope. In various embodiments, one or more of the above described problems have been reduced or eliminated, while other embodiments are directed to other improvements.

Disclosed herein is a method of using a Folded Tubular Photometer for measuring a pollutant or other species in air or another gas based on absorbance of light in the ultraviolet (UV), visible or infrared (IR) spectral regions. Chemical species that can be measured by the method include, but are not limited to, the common air pollutants $O_3$, $NO_2$, $SO_2$ and black carbon particulate matter. Measurements of these species are made possible by using long path absorbance (typically a couple meters or more) within a tubular detection cell that may or may not include mirrors to fold the absorbance path into a compact form. The light source may be a LED and the detector may be a photodiode, although other light sources and detectors could also be used. The interior of the tubular detection cells may be polished to increase the transmission of light through the cells by reflections from the cell walls. Measurements are made of the light intensity I with the analyte to be measured present in the sample gas; and $I_o$ with the sample gas scrubbed of the analyte, typically by passing through a solid-phase analyte scrubber (for gases) or filter (for particulate matter). The analyte concentration may be calculated from the measurements of I and $I_o$, extinction coefficient (a) for the species of interest, and optical path length (l) using the Beer-Lambert Law (equation 1 above), and the instrument may be calibrated using gases having known analyte concentrations. Flow rates, I and $I_o$ measurement cycling times, number of tubular detection cells, optical path length, and detection cell volume are chosen by those skilled in the art to achieve the desired response time and measurement precision for the analytes of interest.

As discussed above, it was discovered that an essential consideration when using a Folded Tubular Photometer approach is the avoidance of large measurement errors that would occur if the measurement of I and $I_o$ are not made at the same or substantially the same total pressure. In the case of $NO_2$, for example, this error may amount to tens to hundreds of ppb, which is large in the context of values commonly found in ambient air. Typically, the pressure within the tubular detection cells is lower when the sample air is being passed through the analyte scrubber(s) or filter(s), as the case may be depending on the analyte and system configuration. In order to reduce this error to acceptable levels, the pressure may be adjusted in real time to be as nearly identical as possible between the rapid measurements of I and $I_o$ (e.g., within approximately 0.1 mbar of each other). In one embodiment, the sample gas flow could simply be stopped by turning off the air pump or by switching a three-way valve arranged between the optical bench and the air pump to allow the pressure within the tubular detection cells to come to ambient pressure during measurements of $I_o$ (analyte scrubbed) and I (analyte present). In some embodiments, the sample gas flow could be controlled using a proportional valve, such as a voltage sensitive orifice valve (VSO), arranged upstream and/or downstream of the optical bench. A feedback loop may be provided to control and adjust the proportional valve orifices in response to feedback to maintain a constant flow rate and hence pressure within the tubular detection cells during both I and $I_o$ measurements. In another embodiment, I and $I_o$ measurements may be made at nearly the same pressure by actively sampling analyte-scrubbed or unscrubbed air into the optical bench from a high conductance overflow tee. However, this approach requires an additional air pump and has the disadvantage that the analyte must flow through a pump where a portion of the sample could be lost to uptake by surfaces within the pumping chamber, which is particularly problematic for measuring black carbon and other particulates. In yet another embodiment with particularly good precision, a variable orifice may provide a bleed of ambient air into the sample gas stream between the optical bench and the sampling pump. A feedback loop may be used to maintain the pressure measured within, upstream, or downstream of the optical bench within a range of approximately 0.1 mbar throughout the cyclic measurements of $I_o$ and I. Of course, the pressure within the tubular detection cells may be equalized in other suitable ways not expressly discussed herein, and still fall within the scope and spirit of the present disclosure.

In conventional absorbance photometers, the added step of matching pressures during I and $I_o$ measurements is not taken because the detection cells are short enough, typically 30 cm or less, that a significant error does not occur. In previous work, inlet and/or outlet pressures have sometimes been adjusted for reasons other than described above. Examples are pressure adjustments for measurements of air pollutants made from aircraft to either concentrate a species, making it more detectable, or to prevent errors due to variations in the absorption cross sections with pressure, which varies with altitude. The latter is particularly important for infrared-absorbing species such as $CO_2$ (Daube et al., 2002).

In an embodiment method for measuring the concentration of one or more gaseous or particle analytes in a sample gas (e.g., ambient air) according to the present disclosure, the method comprises the step of drawing the sample gas into a folded tubular photometer at a flow rate via an air pump. For example, the one or more gaseous or particle analytes may be $NO_2$, $O_3$, $SO_2$ or black carbon. The folded tubular photometer may comprise an analyte scrubber or filter, a detection cell, and at least one element to equalize the pressure inside the detection cell during the measurement of the one or more gaseous or particle analytes. The analyte scrubber or filter is arranged upstream from the detection cell and configured to remove the one or more gaseous or particle analytes from the sample gas. The detection cell may comprise a plurality of tubes through which the sample gas passes and which form an optical path between one or more light sources which emit light at wavelengths absorbed by the one or more gaseous or particle analytes and a light detector which measures light intensity. The optical path is folded by one or more reflective elements which redirect light emitted from the one or more light sources through each of the plurality of tubes. In some embodiments, the optical path of the detection cell is formed by the plurality of tubes and the one or more reflective elements. For example, the one or more reflective elements may be formed by one or more mirror modules containing one or more mirrors which redirect light emitted from the one or more light sources to the light detector. Airtight seals may further be provided at connections between the plurality of tubes and the one or more mirror modules along the optical path.

In a further step, the sample gas may be selectively directed to either pass through the analyte scrubber or filter during an $I_o$ measurement cycle, or to bypass the analyte scrubber or filter during an I measurement cycle, with each of the $I_o$ measurement cycle and the I measurement cycle lasting for a set time period. The set time period is long enough to allow the sample gas to be substantially flushed from the detection cell and to allow a signal averaging time that achieves a desired precision in the measured concentration of the one or more gaseous or particle analytes. In another step, a light intensity measurement $I_o$ may be made during a latter portion of the $I_o$ measurement cycle after the detection cell has been substantially flushed of the sample gas from a preceding I measurement cycle, or a light intensity measurement I may be made during a latter portion of the I measurement cycle after the detection cell has been substantially flushed of the sample gas from a preceding $I_o$ measurement cycle. In another step, the sample gas may be selectively redirected to either bypass the analyte scrubber or filter at the end of the $I_o$ measurement cycle thereby beginning the I measurement cycle, or to pass through the analyte scrubber or filter at the end of the I measurement cycle thereby beginning the $I_o$ measurement cycle. In another step, the pressure inside the detection cell may be equalized within a range of approximately 0.1 mbar when the light intensity measurement $I_o$ and the light intensity measurement I are made. In another step, the concentration of the one or more gaseous or particle analytes in the sample gas may be quantified using the Beer-Lambert Law, the light intensity measurement $I_o$ and the light intensity measurement I. In yet another step, NO in the sample gas may be converted to $NO_2$ by reaction with ozone prior to entering the optical path of the detection cell.

For example, in an embodiment method for measuring the concentration of $NO_2$ in a sample gas using a folded tubular photometer according to the present disclosure, the folded tubular comprises a detection cell, at least one element to equalize the pressure inside the detection cell during the $NO_2$ measurement, and a $NO_2$ scrubber following a sample gas inlet. The $NO_2$ scrubber is arranged upstream from the detection cell and configured to remove $NO_2$ from the sample gas. The detection cell may comprise a plurality of tubes and one or more mirror modules forming a folded optical path between a light source which emits light at wavelengths that are absorbed by $NO_2$ and a light detector which measures light intensity. In certain embodiments, the light source may have a maximum emission wavelength near 405 nm. In a step of the method, the sample gas is drawn into the folded tubular photometer at a flow rate via an air pump. In a further step corresponding to a first valve configuration of the system, the sample gas may be directed to pass through the $NO_2$ scrubber resulting in a scrubbed sample gas. The sample gas may then flow into the detection cell and a light intensity $I_o$ for $NO_2$ may be measured. In another step, the first valve configuration may be replaced by a second valve configuration. In the second valve configuration, the sample gas may be directed to bypass the $NO_2$ scrubber resulting in an unscrubbed sample gas. The unscrubbed sample gas may then flow into the detection cell and a light intensity I for $NO_2$ may be measured. Each of the first and second valve configurations may last for a set time period. The set time period is long enough to allow the scrubbed sample gas or unscrubbed sample gas to be substantially flushed from the detection cell and to allow a signal averaging time that achieves a desired precision in the measured concentration of the $NO_2$. The light intensity $I_o$ may be measured during a latter portion of the first valve configuration after the detection cell has been substantially flushed of the unscrubbed sample gas from a preceding measurement of light intensity I. Likewise, the light intensity I may be measured during a latter portion of the second valve configuration after the detection cell has been substantially flushed of the scrubbed sample gas from a preceding measurement of light intensity $I_o$. In another step, the pressure inside the detection cell may be equalized within a range of approximately 0.1 mbar when the measurements of light intensity I and light intensity $I_o$ are made. In another step, the concentration of $NO_2$ in the sample gas may be quantified using the Beer-Lambert Law and the measurements of light intensity $I_o$ for $NO_2$ and light intensity I for $NO_2$. In yet another step, NO in the sample gas may be converted to $NO_2$ by reaction with ozone prior to entering the optical path of the detection cell.

In an embodiment method for measuring optical extinction by particles in a sample gas according to the present disclosure, the method comprises the step of drawing the sample gas into a folded tubular photometer at a flow rate via an air pump. The folded tubular photometer may comprise a particle filter, a detection cell, and at least one element to equalize the pressure inside the detection cell during light intensity measurements. The particle filter is arranged upstream from the detection cell and configured to remove particles from the sample gas. The detection cell may comprise a plurality of tubes through which the sample gas passes. The plurality of tubes form an optical path between at least one light source which emit light at one or more wavelengths absorbed or scattered by some fraction of the particles and a light detector which measures light intensity at the one or more wavelengths. For example, at least one light source may emit light at wavelengths in the visible or near infrared to quantify the concentration of black carbon. In other embodiments, at least one light source may emit light at wavelengths in the ultraviolet to provide an estimate of the concentration of brown carbon. Moreover, two or more lights sources may be provided with each having different wavelengths at maximum emission intensity. In some embodiments, the light source may have a maximum emission intensity at a wavelength at or near 880 nanometers. The optical path may be folded by at least one mirror module containing one or more reflective elements or mirrors which redirect a light beam emitted from the at least one light source through the plurality of tubes. The at least one mirror module may form gas-tight seals with adjacent tubes of the plurality of tubes. In a further step corresponding to a first valve configuration of the system, the sample gas may be directed to pass through the particle filter resulting in a scrubbed sample gas. The scrubbed sample gas mixture may then flow into the detection cell, and a light intensity $I_o$ may be measured at the one or more wavelengths. In another step, the first valve configuration may be replaced by a second valve configuration. In the second valve configuration, the sample gas may be directed to bypass the particle filter resulting in an unscrubbed sample gas. The unscrubbed gas may then flow into the detection cell, and a light intensity I may be measured at the one or more wavelengths. Each of the first and second valve configurations may last for a set time period. The set time period is long enough to allow the scrubbed sample gas or unscrubbed sample gas to be substantially flushed from the detection cell and to allow a signal averaging time that achieves a desired precision in the measured concentration of the particles. The light intensity $I_o$ may be measured during a latter portion of the first valve configuration after the detection cell has been substantially flushed of the unscrubbed sample gas from a preceding measurement of light intensity I. Likewise, the light intensity I may be measured during a latter portion of the second valve configuration after the detection cell has been substantially flushed of the scrubbed sample gas from a preceding measurement of light intensity $I_o$. In another step, the pressure inside the detection cell may be equalized within a range of approximately 0.1 mbar when the measurements of light intensity I and light intensity $I_o$ are made. In another step, the concentration of particles in the sample gas may be quantified using the Beer-Lambert Law and the measurements of light intensity $I_o$ and light intensity I at the one or more wavelengths.

In some embodiments according to the present disclosure, the pressure inside the detection cell may be equalized by introducing a variable airflow into the sample gas downstream from the detection cell, the variable airflow being controlled by a feedback loop. In other embodiments, the pressure inside the detection cell may be equalized by variable restriction of the sample gas at a point upstream or downstream from the detection cell, the variable restriction being controlled by a feedback loop. In yet other embodiments, the pressure inside the detection cell may be equalized by an inlet pump and an overflow tee upstream from the detection cell. The at least one element to equalize the pressure inside the detection cell may then comprise the corresponding structural components necessary for implementing these various embodiments.

In addition to the exemplary aspects and embodiments described above, further aspects and embodiments will become apparent by reference to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures. It is intended that the embodiments and figures disclosed herein are to be considered illustrative rather than limiting. Also, the terminology used herein is for the purpose of description and not of limitation.

DETAILED DESCRIPTION

Figure 1:
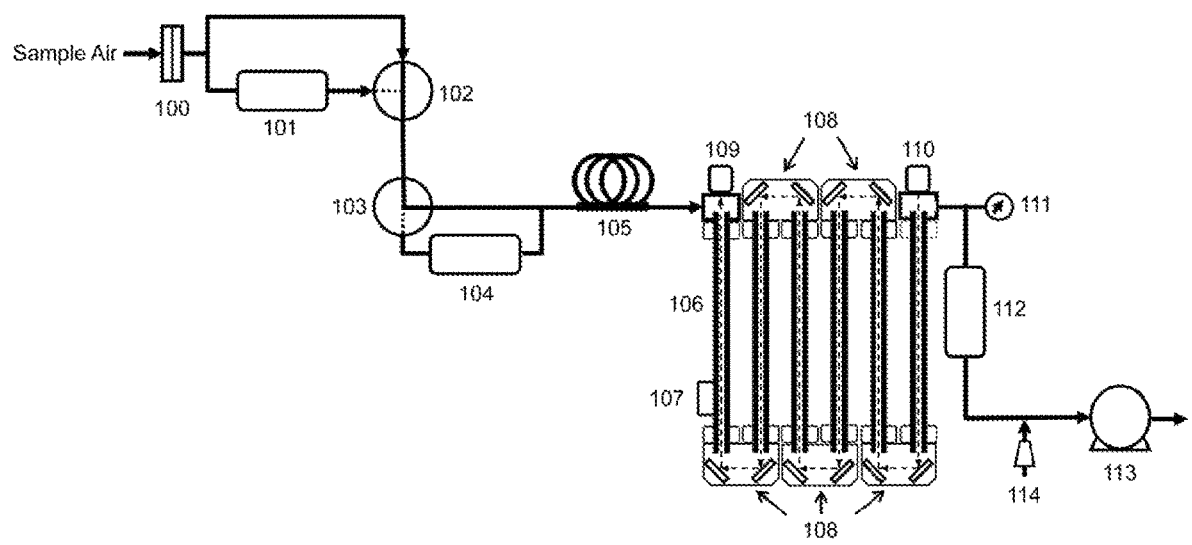
FIG. 1 is a schematic diagram of a Folded Tubular Photometer for measuring the concentrations of analytes in a sample gas, with example analytes including, but not limited to, $O_3$, $NO_2$, $SO_2$, and black carbon based on the absorbance of UV ($O_3$, $SO_2$), visible ($NO_2$, black carbon) or infrared (black carbon) light.

FIG. 1 is a schematic diagram of one embodiment of a Folded Tubular Photometer for measurements of gas-phase molecules or particles based on attenuation of light by absorption by gases or extinction (absorption and scattering) by particles according to the method of the present disclosure. A gas sample pump 113 draws a sample gas through the entire apparatus. Sample gas (hereafter referred to as sample air, although other gases may be analyzed) enters the instrument through an optional particle filter 100. This filter 100 prevents particles in the sample air from interfering with the absorbance measurements of gaseous species. The filter material is preferably polytetrafluoroethylene (PTFE) or another material that efficiently passes gases while removing particulate matter. Particle filter 100 is not used in instruments designed for measurements of particulates and is not necessary for measurements of analytes in gases that are free of particles.

Three-way valve 102 directs the sample air to either bypass (represented by the solid line within valve 102) or pass through (represented by the dashed line within valve 102) the instrument zeroing scrubber 101. Scrubber 101 contains material that nearly completely removes the analyte (typically >99% removal) to be quantified. For example, for measurements of ozone, the scrubber 101 can be a metal oxide such as hopcalite, which is a mixture of copper and manganese oxides that catalyze the conversion of ozone to oxygen; for $NO_2$ or $SO_2$, the scrubber 101 may be activated carbon for adsorbing those species and thereby removing them from the gas phase; and for particulate matter such as black and brown carbon, the scrubber 101 can be a particle filter made of glass fibers, PTFE or other suitable materials used for removing particles from a gas stream. The purpose of scrubber 101 is to serve as a "instrument zeroing" scrubber (i.e., it allows one to make an instrumental zero measurement in the absence of the analyte of interest). The value obtained, which ideally would be close to zero, may be subtracted from the measured value obtained with unscrubbed sample air in order to correct for any instrument offset. In practice, scrubber 101 and valve 102 would be used at relatively infrequent intervals (e.g., once per hour or once per day) to determine and update an instrument offset correction value, if any. Valve 102 and scrubber 101 are optional, because the instrument can be zeroed in alternative ways such as by sampling from a gas cylinder or other source of "zero" (purified) air.

Sampled air next passes through three-way valve 103, which either directs the air through analyte scrubber 104, which is similar or identical to instrument zeroing scrubber 101, to remove the analyte from the flowing stream, or through a tube or other conduit connection bypassing scrubber 104. As in the Examples given below, this valve 103 may be switched every 5 seconds allowing measurements of light intensity $I_o$ (sample air passing through scrubber 104) or I (sample air bypassing scrubber 104) by light detector module 109. It is desirable that this valve be switched as frequently as possible in order to minimize any effect from the drift of the lamp intensity on the measurements of I and $I_o$. On the other hand, it is important that sufficient time be allowed for the tubular detection cell volume to be nearly or completely flushed with the analyte-containing sample air or analyte-scrubbed sample air between I and $I_o$ measurements. This requirement sets a limit on how frequently valve 103 can be switched. A time of 5 s was found to be more than adequate for a tubular detection cell volume of 35.6 $cm^3$ (0.47625 cm i.d., 200 cm long) and flow rate of 1.8 L/min (30 $cm^3$/s). This combination of flow rate, detection volume and valve switching time provides ~4 flushes (30 $cm^3$/s×5 s/35.6 $cm^3$=4.2) of the detection volume between measurements. One can easily estimate the optimal flush time for an optical bench having different dimensions or at different flow rates based on this principle. Alternatively, flush times for a chosen optical bench may be determined experimentally by monitoring the light intensity while varying either the flow rate or valve switching rate. Accordingly, the sample gas flow rate and/or time period between the I and $I_o$ measurements may be readily adjusted to achieve a sufficient number of flush cycles between the I and $I_o$ measurements, depending on the desired application of the method and the detection volume (which may also be adjusted in modular constructions, as described below, allowing for further customization to the process).

Sample air next passes through one or more tubes 105 composed of Nafion™ (a co-polymer of tetrafluoroethylene and perfluoro-3,6-dioxa-4-methyl-7-octene-sulfonic acid) or a comparable material, hereafter referred to as SPTFE (for sulfonated polytetrafluoroethylene). If multiple tubes are used, the tubes may be plumbed in parallel to provide less of a pressure drop. The SPTFE tube(s) is optional for measurements of analytes in dry air or in air at constant humidity, but may be required for ambient air measurements where humidity levels vary. The SPTFE tube(s) selectively transports water molecules across the tube wall and brings the humidity inside the tube to approximately the same level as in the surrounding air. Because analyte scrubber 104 may either add or remove water vapor from the sample gas flow stream by adsorption/desorption, depending on past history of exposure to water vapor, without the SPTFE tube(s) the water vapor concentration may change within the detection volume. Wilson and Birks (2006) first demonstrated the use of a SPTFE tube in a UV-absorption-based ozone monitor to remove the water vapor interference by equilibrating humidity just prior to entering the detection cell. They showed that interference resulted from changes in the transmission of light through the detection cell during measurements of $I_o$ and I due to adsorption of differing amounts of water vapor on the cell wall during ozone-scrubbed and unscrubbed measurements, respectively. Where the typical flow rate is approximately 1.8 L/min, four 25-cm long, 1.07-mm i.d., 1.35-mm o.d. tubes of SPTFE (total of 1 m length) were found to effectively remove any interference from rapid changes in relative humidity of sampled air. Use of higher flow rates require proportionally larger internal surface areas (longer SPTFE tubes at constant i.d.) to prevent humidity interferences. It should be noted that the use of SPTFE tubing 105 is not required for particle measurements since the analyte scrubber 104 can be a hydrophobic particle filter of very low surface area, which absorbs/releases very little water vapor. Also, use of SPTFE tubing can be a detriment in the measurement of particle extinction since larger particles will be lost within the tubing.

The sample air flow next enters the optical bench (components 106 through 110) of FIG. 1. The optical bench may comprise one or more tubular detection cells 106 (six shown in FIG. 1) and an appropriate number of mirror modules 108 (five shown in FIG. 1), each containing two mirrors oriented at 45° to the flow path. The mirror modules 108 allow sample air to flow through them and to enter the subsequent tubular detection cell 106. The mirrors within the mirror modules 108 are oriented to direct the light along the same path, either in the same direction or opposite direction of the air flow (shown in FIG. 1 as counter to the air flow). The mirrors fold the optical path so as increase the sensitivity of the measurement by increasing the path length. This follows from the Beer-Lambert Law (equation 1 above), which states that the absorbance of light is proportional to both the concentration of the analyte and the path length through the sample. It should be appreciated that different arrangements of tubular detection cells and mirror modules (as well as the mirror configurations and mirror angles within said modules) may be provided within the scope and spirit of the present disclosure, so long as the optical path of the light beam is continuous for a desired path length between the light source and the light detector. In addition to or in place of the mirrors and mirror modules described here, other reflective elements may be provided within the scope and spirit of the present disclosure, so long as they serve to fold the optical path within the optical bench.

After the air sample passes through each of the connected tubular detection cells 106 and mirror modules 108, it passes through optional exhaust scrubber 112 to remove any chemical species that may be damaging to the air pump 113. Sample air exiting air pump 113 may be exhausted directly to ambient air, especially if exhaust scrubber 112 is utilized, or may be vented via an outlet tube to a laboratory hood or distant location.

The light source module 110 contains a light source that emits light of the appropriate wavelength(s) to be selectively absorbed by the analyte of interest. The light source for most analytes may be a light emitting diode (LED), although other light sources, such as laser diodes or low-pressure mercury lamps, may be used as well. LEDs are readily available with emissions ranging from about 250 nm in the ultraviolet to about 950 nm in the infrared. In some embodiments, LEDs with bandwidths of a few tens of nanometers may be preferable over laser diodes. Although laser diodes are much brighter, are highly collimated and have a very narrow bandwidth, they typically exhibit much lower stability (larger fluctuations in intensity on times scales of a few seconds). Low-pressure mercury lamps (253.7 nm) may be used for ozone, but LEDs with an emission maximum near 250 nm are now available and have also been used to measure ozone (Kalnajs and Avallone, 2010). Sulfur dioxide absorbs throughout the UV spectrum and has an absorption maximum near 290 nm that is preferred for measurements using this technique. In an application described here, an LED with maximum emission at 405 nm was utilized to measure $NO_2$ (and NO by reaction with $O_3$ to form $NO_2$), and black carbon was measured using an LED with maximum emission near 870 nm. It is often useful to characterize aerosols by measuring extinction at multiple wavelengths, with measurements in the near UV often referred to as "brown carbon measurements." For this purpose, multiple LEDs may be combined using either dichroic mirrors or fiber optics, and the LEDs switched on and off to measure multiple species (e.g., $SO_2$ at 290 nm and $NO_2$ at 405 nm in the same air sample) or to characterize the light-absorbing components of an aerosol as black carbon (e.g., extinction near 880 nm) or brown carbon (e.g., extinction near 370 nm).

Typically, a large fraction of the light (>90%) from the light source 110 is lost to partial reflection at the tubular detection cell walls and mirrors, and the fraction of light arriving at the light detector module 109 depends on a number of factors such as the degree of collimation of the light source, reflectivity of the cell walls and mirrors, humidity of the sample, and the pressure within the detection volume (as unexpectedly discovered). However, these losses have no effect on the measurement of the analyte concentration so long as the losses remain constant during measurements of $I_o$ (analyte scrubbed) and I (analyte present). The concentration of the analyte (typically in units of molec/cm$^3$ for gases; μg/m$^3$ for particulates) is calculated using the Beer-Lambert Law (equation 1 above) from the extinction coefficient averaged over the bandwidth of the light source; the path length of the light beam, calculated from the dimensions of the optical bench; and the electrical signals (current or voltage) of the light detector which are proportional to $I_o$ and I. Since $I_o$ and I are not measured at exactly the same time (e.g., 5 s apart), one can average the values of $I_o$ measured before and after the measurement of I in order to increase the precision and accuracy of the measurement. Also, other algorithms known to practitioners in the art of absorbance spectrometry, including digital filters, may be applied to the raw signals to improve the precision and accuracy of the analyte concentration measurements.

A temperature sensor 107 and pressure sensor 111 may be used to make temperature and pressure measurements for the purpose of calculating a mixing ratio of the analyte, typically in parts-per-billion (ppb) or parts-per-million (ppm) by volume. These sensors may be positioned in the optical bench as desired in order to obtain the best estimates of the average temperature and pressure within the optical path; for example, sensors could be placed directly upstream and/or downstream from the optical bench. Variations in temperature and pressure along the optical bench are usually small and any variations arising from the relative placement of the sensors may be compensated for by calibration using standard gases of known compositions. From temperature and pressure measurements, one can calculate the total gas molecular concentration using the ideal gas law (N/V=P/kT), where N/V is the concentration of total gas molecules, P is the pressure, T is the absolute temperature and k is the Boltzmann constant in appropriate units. Dividing the analyte concentration measured by absorbance using the Beer-Lambert Law (equation 1 above) by the total molecular concentration calculated from the ideal gas law and multiplying by $10^6$ or $10^9$ gives the mixing ratio in ppm or ppb by volume, respectively.

Variable orifice valve 114 serves a particularly critical function for practicing a method according to the present disclosure. In the depicted embodiment, a voltage sensitive orifice (VSO) valve 114 is used to admit air to the flowing stream after the optical bench (folded structure comprising components 106 through 110 forming the optical absorbance pathway) and prior to the air pump 113. The voltage applied to the VSO valve 114 is adjusted to bring the pressure of the sample air within the optical bench, as measured at pressure sensor 111, to the same pressure, typically within an error of 0.1 mbar, during I and $I_o$ measurements. This eliminates a potentially large error resulting from the effect of pressure on the transmission of light through the optical bench. Because analyte scrubber 104 is more restrictive than the bypass, the pressure within the optical bench is lower when the air is being drawn through scrubber 104 ($I_o$ being measured). To compensate, variable orifice valve 114 is adjusted in a feedback loop to allow more outside air to enter the Folded Tubular Photometer than during the measurement with air bypassing the scrubber 104 (I being measured). In one embodiment, pressure adjustment using variable orifice valve 114 may be made during the first 2 seconds of the 5-s cycle during which the detection volume of the optical bench is also being flushed. The values of I and $I_o$ are measured near the end of the corresponding 5-s cycles after the pressure adjustment is achieved. Of course, pressure adjustment time may be longer or shorter in duration, and may also be adapted depending on the period of time between the $I_o$ and I measurements (e.g., if a 10-s cycle were used); what is important is that the pressures have been matched and a sufficient number of flush cycles have occurred between the $I_o$ and I measurements.

Figure 2:
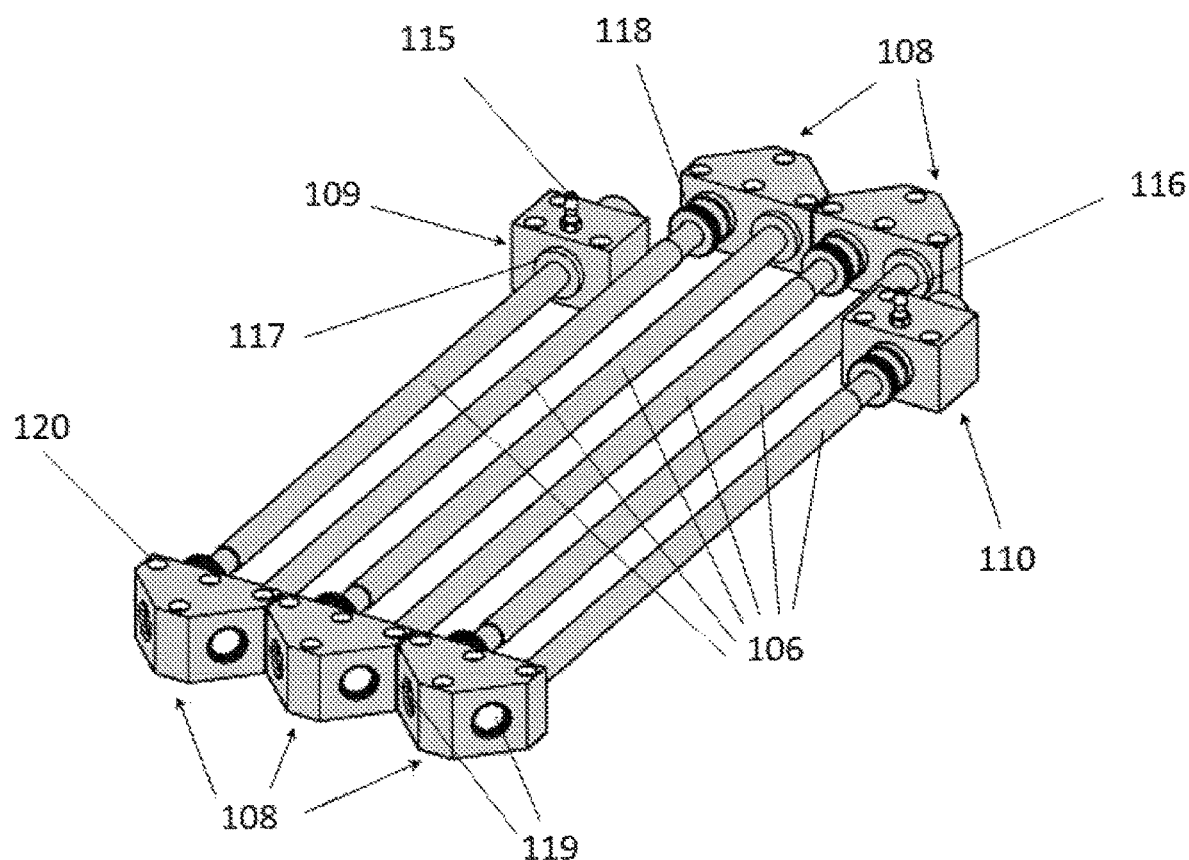
FIG. 2 is a perspective drawing showing the various modular components of the optical bench of a Folded Tubular Photometer.

FIG. 2 is a more detailed perspective drawing of the modular optical bench of FIG. 1, with reference numerals corresponding to the same components. Again, the depicted optical bench comprises six tubular detection cells 106 and five mirror modules 108, although other numbers and configurations of tubular detection cells and mirror modules could be used depending on the desired application. In this example, not all of the tubular detection cells are of the same length. The optical bench further comprises a light source module 110 and a light detector module 109. Tubing connections for the air inlet 115 (at the light detector module 109) and air outlet 116 (at the light source module 110) of the optical bench are shown. The flow could be reversed with 116 being the inlet and 115 the outlet with no effect on the analyte measurements. In the depicted embodiment, each mirror module contains two mirrors 119. The illustrated optical bench—constructed for use in the Examples that follow—uses o-rings to seal the two ends of each tubular detection cells 106 to a mirror module 108, light source module 110 or light detector module 109 as the case may be. One end of each tubular detection cell 106 has a flange 117 that compresses an o-ring in a groove of one of the mirror, light source, or light detector modules. The opposite end is sealed using an o-ring compression fitting 118 to a mirror, light source, or light detector module. The mirror modules 108, light source module 110, and light detector modules may be mounted to a rigid plate (not shown) via bolts passing through bolt holes 120 for stability. The modular nature of the optical bench allows the path length to be increased or decreased by adding or removing tubular detection cells 106 and mirror modules 108 as desired for measurements of analytes in varying concentration ranges. Also, as shown in FIG. 2, tubular detection cells 106 may be of different lengths, making virtually any path length possible. The materials used for construction of the optical bench should be inert toward the analyte being measured, with no significant loss of the analyte to exposed surfaces. For example, aluminum, stainless steel and fluoropolymers such as PTFE may be used. The Examples given below made use of an optical bench constructed of aluminum. In order to increase transmission of light, the interior surfaces of the tubular detection cells were polished using either a cylinder hone or a metal bristle brush of the type used to clean gun barrels.

Figure 3:
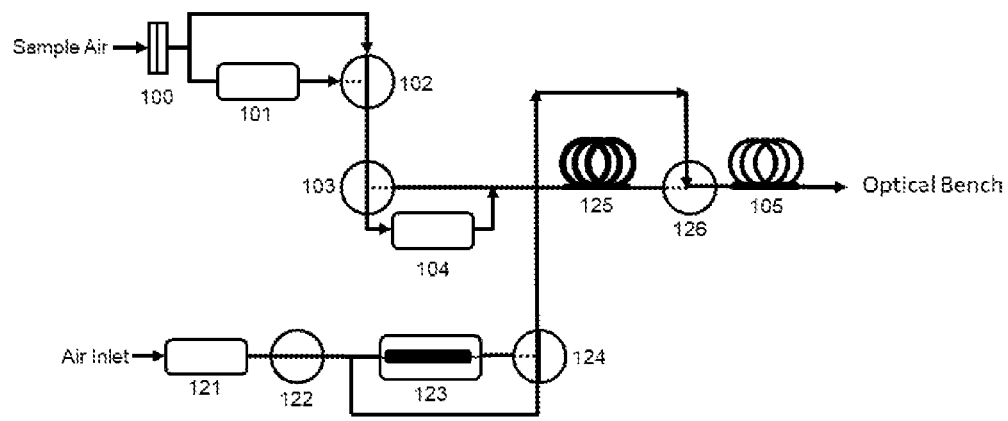
FIG. 3 is a schematic diagram showing the three-way valve states for measuring (a) $I_o$ for $NO_2$; (b) I for $NO_2$ and $I_o$ for NO; and (c) I for NO. As described in more detail below, the corresponding values of $I_o$ and I may be used to quantify $NO_2$ (without ozone added) and NO (with ozone added).
Figure 3:
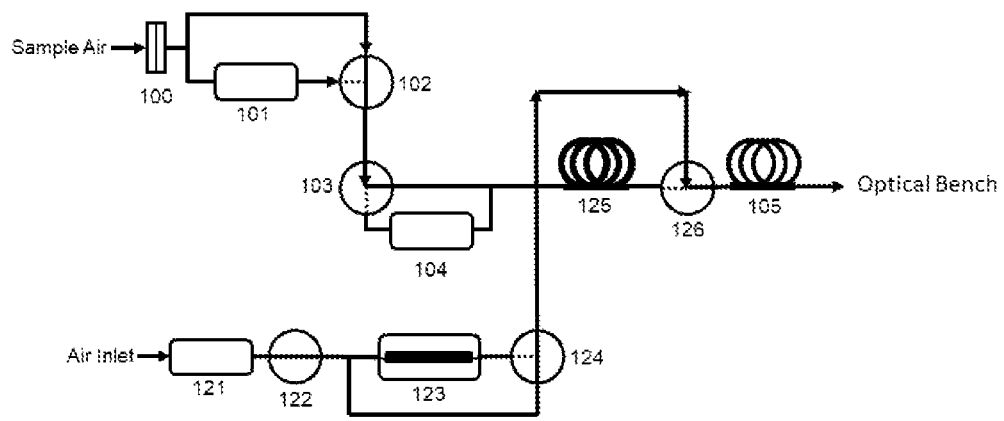
Figure 3:
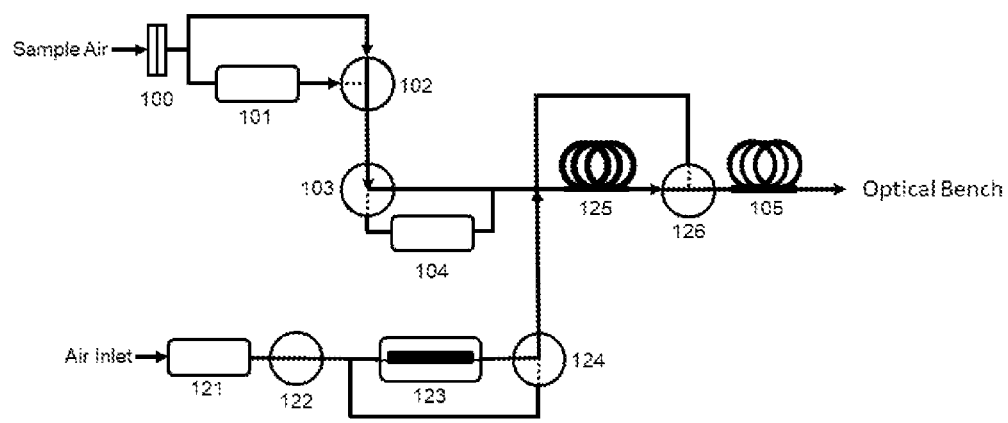

FIG. 3 is a schematic diagram of the inlet system of a Folded Tubular Photometer designed to measure both nitrogen dioxide ($NO_2$) and nitric oxide (NO) using an LED light source with maximum emission at 405 nm. $NO_2$ absorbs at 405 nm with an absorption cross section of ~$6\times10^{-19}$ $cm^2$/molec (Burrows et al., 1998), but NO does not absorb at this wavelength. The inlet system is the same as in FIG. 1 but with some additions that allow conversion of NO to $NO_2$ by the highly selective reaction of NO with $O_3$ to form $NO_2$ (reaction 3). The three panels of FIG. 3 show the valve configurations or states a (FIG. 3a), b (FIG. 3b), c (FIG. 3c) that allow measurement of $I_o$ for $NO_2$ (valve configuration a), I for $NO_2$ and $I_o$ for NO (valve configuration b), and I for NO (valve configuration c). Scrubbers 101 and 104 contain material that will scrub both $NO_2$ and NO (e.g., a combination of manganese dioxide to oxidize NO to $NO_2$ and activated carbon to remove $NO_2$). In FIG. 3a, valve 102 allows sample air entering at a flow rate of ~1.8 L/min to bypass zeroing scrubber 101; valve 103 directs the sample air through analyte scrubber 104 so that $NO_2$ (and NO) are removed; valve 124 directs ~70 $cm^3$/min of $NO_R$-scrubbed inlet air, having passed through a NOR scrubber 121 and an on/off valve 122, to bypass the ozone generator 123 and mix with the sample air stream; and valve 126 directs the combined flow to bypass the reaction coil 125, pass through the SPTFE tube(s) 105 and enter the optical bench. In this configuration, only $NO_R$-scrubbed air passes through the optical bench and the light intensity $I_o$ for $NO_2$ is measured. Correction can be made for dilution of $NO_2$ and NO in the air sample by multiplying by the dilution factor (e.g., 1.87/1.80 for the typical flow rates given above as an example; other flow rates may be specified).

FIG. 3b differs from FIG. 3a only in that the state of valve 103 is changed so that sample air bypasses analyte scrubber 104. The $NO_2$ present in the sample stream now attenuates light passing through the optical bench and the light intensity I is measured for $NO_2$ Using the value of $I_o$ measured in valve configuration a and the value of I measured in valve configuration b, the $NO_2$ concentration can now be calculated using the Beer-Lambert Law (equation 1 above). The light intensity measured using configuration b also serves as the $I_o$ for calculation of the NO concentration.

FIG. 3c differs from FIG. 3b in that the state of valve 124 is changed such that the flow (typically ~70 $cm^3$/min) of $NO_R$-scrubbed air passes through ozone generator 123, and the state of valve 126 is changed such that ozonized air exiting valve 124 mixes with sample air and then passes through reaction coil 125, where NO reacts with ozone to form $NO_2$. Flow rates, ozone mixing ratio and other conditions of the photometer are specified by those skilled in the art to ensure complete reaction of the NO with ozone, as illustrated in the example described herewith. The ozone mixing ratio in the combined streams (ozonized air mixed with sample air) is typically 8 ppm. The typical reaction coil is constructed from a 1-m length of 0.635-cm i.d. PTFE or other inert tubing coiled to a diameter of ~7.6 cm, producing a reaction volume of 31.7 $cm^3$ and residence time of 1.0 s for a total flow rate of 1.87 L/min From the integrated rate equation for a pseudo-first-order reaction where NO is in large excess, the reaction is calculated to be 97.8% complete within the reaction coil:

$$\% \text{ Converted} = 100(1-e^{-k[NO]t}) = 97.8 \quad (4)$$

where k is the reaction rate coefficient at 25° C., $1.9\times10^{-14}$ $cm^3$ $molec^{-1}$ $s^{-1}$ (Burkholder et al., 2015; Birks et al., 1976; Borders and Birks, 1982); the concentration of NO is $2.0\times10^{14}$ molec $cm^{-3}$ (8 ppm at 1 atm pressure and temperature of 25° C.); and the residence time, t, is 1.0 s.

Nearly all of the remaining 2.2% of NO is converted during transit through the optical bench, which has a volume of 28.2 $cm^3$ in the example discussed below. The % NO converted at the exit of the optical bench is calculated as 99.9%. Thus, the average amount of converted NO detected within the optical bench and measured is 98.9%.

The light intensity measured using valve configuration c (FIG. 3c) serves as the value of I in the calculation of NO using the Beer-Lambert Law (equation 1 above). Corrections can be made for dilution of $NO_2$ and NO in the air sample by multiplying by the dilution factor (e.g., 1.87/1.80 for the typical flow rates given above). In the case of NO measurements, correction for incomplete reaction can be made by dividing by the average of the fraction of converted; i.e., 0.989 for the flow conditions described above. Alternatively, as is standard practice for air monitors, air standards having known NO and $NO_2$ concentrations can be used to calibrate the outputs of the instrument to match the true values.

In this example, by continuously cycling between valve states a, b and c (typically every 5 seconds) a new value of either NO and/or $NO_2$ may be calculated and updated as follows:

(a) Near the end (typically during the final 2 s) of valve state a: A new value of $I_o$ for $NO_2$ is measured, allowing calculation and updating of a new value of reference $NO_2$ concentration, and the valve state is switched to valve configuration b.

(b) Near the end of valve state b (typically during the final 2 s): A new value of I for $NO_2$ is measured, allowing calculation and updating of a new value of analytical $NO_2$ concentration. Also, a new value of $I_o$ for NO is measured, allowing calculation and updating of a new value of reference NO concentration. The valve state is then switched to valve configuration c.

(c) Near the end of valve state c (typically during the final 2 s): A new value of I for NO is measured, allowing calculation and updating of a new value of analytical NO concentration, and the valve state is then switched back to valve configuration a. Operation of the valves states for measurement of $NO/NO_2$ is discussed further in reference to FIG. 6 below.

Valve 102 in combination with zeroing scrubber 101—which may be similar or identical to analyte scrubber 104—may be used intermittently (e.g., hourly or daily) to obtain a baseline zero for the instrument. When valve 102 is configured to allow sample air to pass through scrubber 101, $NO_2$ and NO are quantitatively removed from the sample air stream. With this valve configuration, sequences a, b and c of FIG. 3 may be repeated as described above to measure the apparent $NO_2$ and NO concentrations. Because the air has been scrubbed of $NO_2$ and NO, those measured concentrations are additive errors or "offsets" that should be applied as corrections to measured results for sample air with zeroing scrubber 101 bypassed. This "zeroing" method is common in commercially-available ambient air monitors but is not a requirement. Another common method of zeroing an air monitor is to occasionally attach an external scrubber to the monitor and measure the offsets in the absence of analytes; in this case, valve 102 and zeroing scrubber 101 are not needed.

Figure 4:
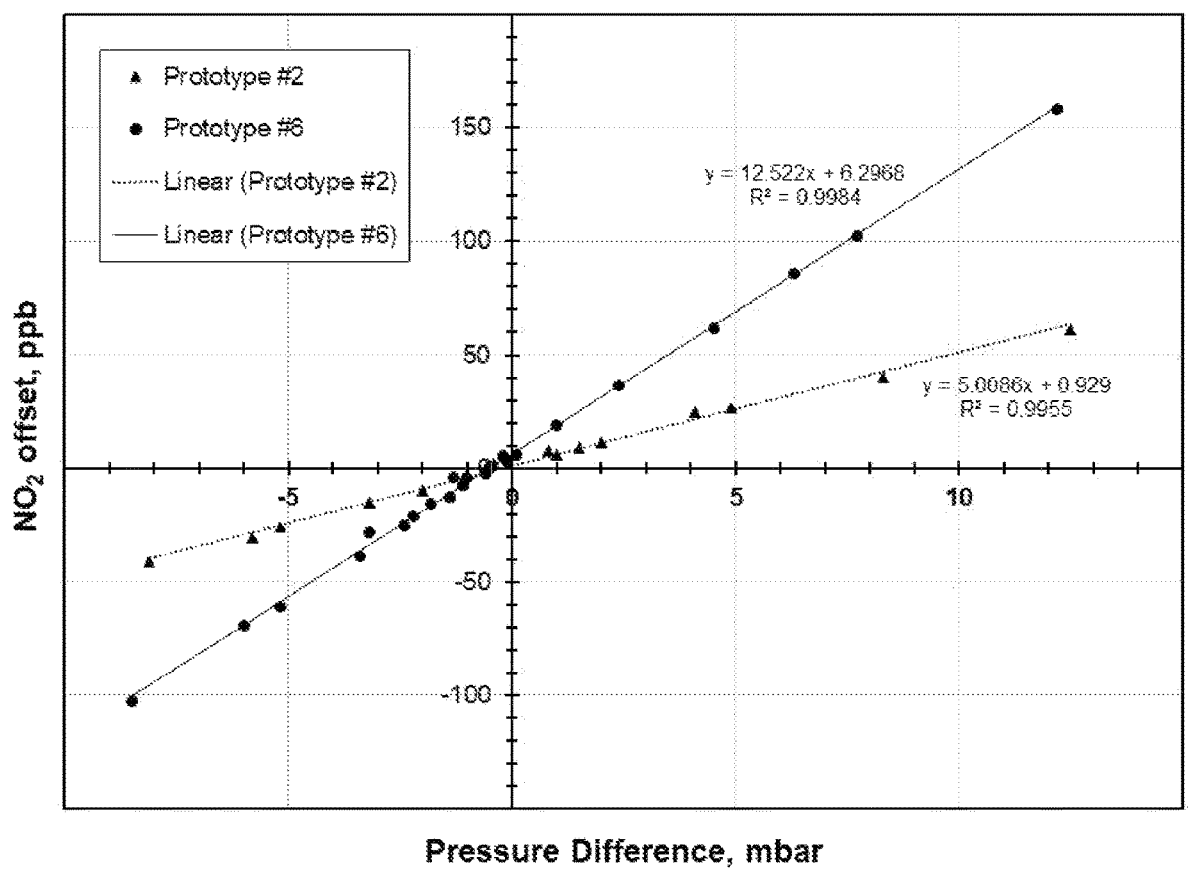
FIG. 4 is a plot of data obtained for the offset (additive error) in ppb of $NO_2$ for a Folded Tubular Photometer of FIG. 1 designed to measure $NO_2$ as a function of the difference in pressure during measurements of light intensities I (sample bypassing $NO_2$ scrubber) and $I_o$ (sample passing through $NO_2$ scrubber).

FIG. 4 illustrates the effect of pressure variation during measurements of $I_o$ and I on an analyte measurement, in this case the measurement of $NO_2$ concentration, using a Folded Tubular Photometer according to FIG. 1 with the modifications described in reference to FIG. 3. In this plot, pressure difference is the internal pressure of the optical bench during the I measurement (i.e. sample air bypassing analyte scrubber 104) minus the pressure within the optical bench during the $I_o$ measurement (i.e., sample air passing through analyte scrubber 104). Since the scrubber 104 adds to the restriction of the system, the downstream pressure in the optical bench is typically lower during the $I_o$ measurement. In order to vary the pressure difference, a needle valve was placed in-line with scrubber 104 or in-line with the bypass around scrubber 104, and the restriction varied. Results are provided for two of the prototype $NO_2$ monitors constructed, Prototype #2 and Prototype #6. The presence of unmatched pressures during the $I_o$ and I measurements was found to produce a false reading (positive or negative), or offset, that is additive to the true $NO_2$ concentration. As can be seen in FIG. 4, the offset varies linearly over the range tested (−9 to 13 mbar) and can be quite large—ranging from −100 to +150 ppb. The slopes of the regression lines for the two prototypes differ, ranging from 5.0 to 12.5 ppb/mbar, and the slopes were found to often vary from instrument to instrument. As discussed earlier, this offset is believed to be due to changes in the transmission of light through the optical bench with changes in pressure, since the magnitude of the offset correlates with the magnitude of the pressure difference. As discussed above, this pressure effect may be a result of the effect of pressure on the refractive index of the sample gas. To our knowledge, this effect has not been reported or otherwise identified before. Thus, according to the method of the present disclosure, the requirement to match the pressures as closely as possible during $I_o$ and I measurements was not previously known nor predicted. Maintenance of constant pressure of an infrared photometer for aircraft measurements of $CO_2$ has been done for an entirely different reason (Daube et al., 2002): in the infrared, the vibrational-rotational absorption lines of gas-phase molecules are known to broaden with pressure, so the sensitivity of the measurements (not the offset) varies with pressure. In other words, such prior stabilization of pressure for aircraft $CO_2$ measurements completely fails to inform the pressure offset problem addressed by the method according to the present disclosure in long-path, low-volume Folded Tubular Photometers.

Figure 5:
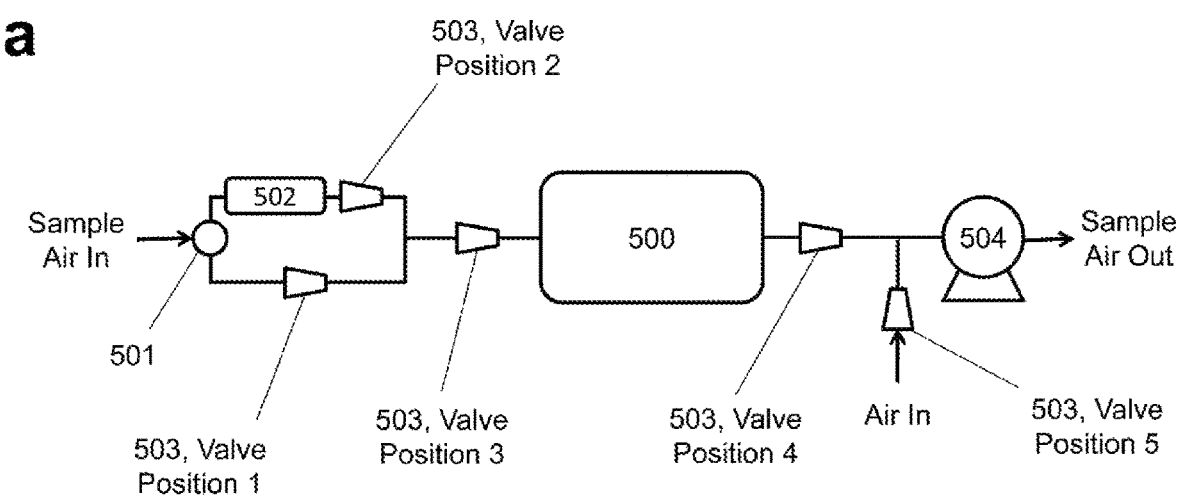
FIG. 5 is a schematic diagram illustrating various methods for equalizing the pressure within the optical bench of a Folded Tubular Photometer during measurements of $I_o$ and I.
Figure 5:
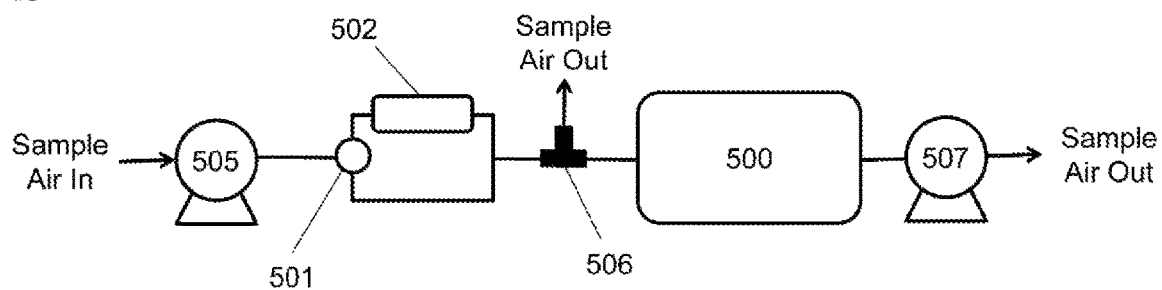

FIG. 5 illustrates different methods for equalizing the pressure within an optical bench 500 of a Folded Tubular Photometer during measurements of $I_o$ and I for an absorbance measurement according to the present disclosure. A three-way valve 501 directs sample air to either pass through an analyte scrubber 502 or to bypass the analyte scrubber 502 before entering the optical bench 500. As shown in FIG. 5a, one method involves using a VSO valve 503 (or other orifice that can be controlled in a feedback loop) in the flow stream before the optical bench 500. This variable orifice 503 can be placed inline with the bypass tubing ("Valve Position 1"), immediately after the analyte scrubber 502 ("Valve Position 2"), or after the flow paths from the analyte scrubber and bypass join ("Valve Position 3"). It is necessary that the bypass tube be more restrictive than the analyte scrubber 502 path if Valve Position 2 is used. That can be accomplished by restricting the bypass tube. Alternatively, the VSO valve 503 may be placed in "Valve Position 4" in the flow path following the optical bench 500. In all of these cases (Valve Positions 1-4), the orifice of valve 503 may be widened or narrowed to reduce or increase the pressure within the optical bench 500. One particularly effective method for controlling the pressure within the optical bench 500 with the observed highest measurement precision is depicted by "Valve Position 5". In this case, the orifice 503 controls the addition of air to the flow path after the optical bench 500 and before the air pump 504 (which draws air into the flow path of the device). Varying the flow rate of added air by varying the voltage applied to this VSO valve 503 at "Valve Position 5" may be used to adjust the upstream pressure within the optical bench 500. Another method for balancing the pressures during measurements of $I_o$ and I is illustrated in FIG. 5b. In this method, sample air is forced through the analyte scrubber 502 or the scrubber bypass using an inlet air pump 505. After the two paths join, the analyte-scrubbed or analyte-unscrubbed sample air enters a high conductance "overflow tee" 506 with one port of the tee open so that excess air can be vented. Outlet air pump 507 draws air from this overflow tee 506 through the optical bench 500. In this approach, it is necessary that the upstream air pump 505 provide an excess supply of air so that there is an overflow in the high conductance tee 506. This method has the advantage of not requiring a VSO or other flow regulating valve. The disadvantages are that two air pumps 505, 507 are required and some fraction of the analyte may be lost while passing through the sampling inlet air pump 505. This is highly problematic for reactive gas-phase species such as $O_3$, $NO_2$, and $SO_2$ as well as for particulate matter.

Example 1: Roadside Measurements of Ambient Levels of $NO_2$

Figure 6:
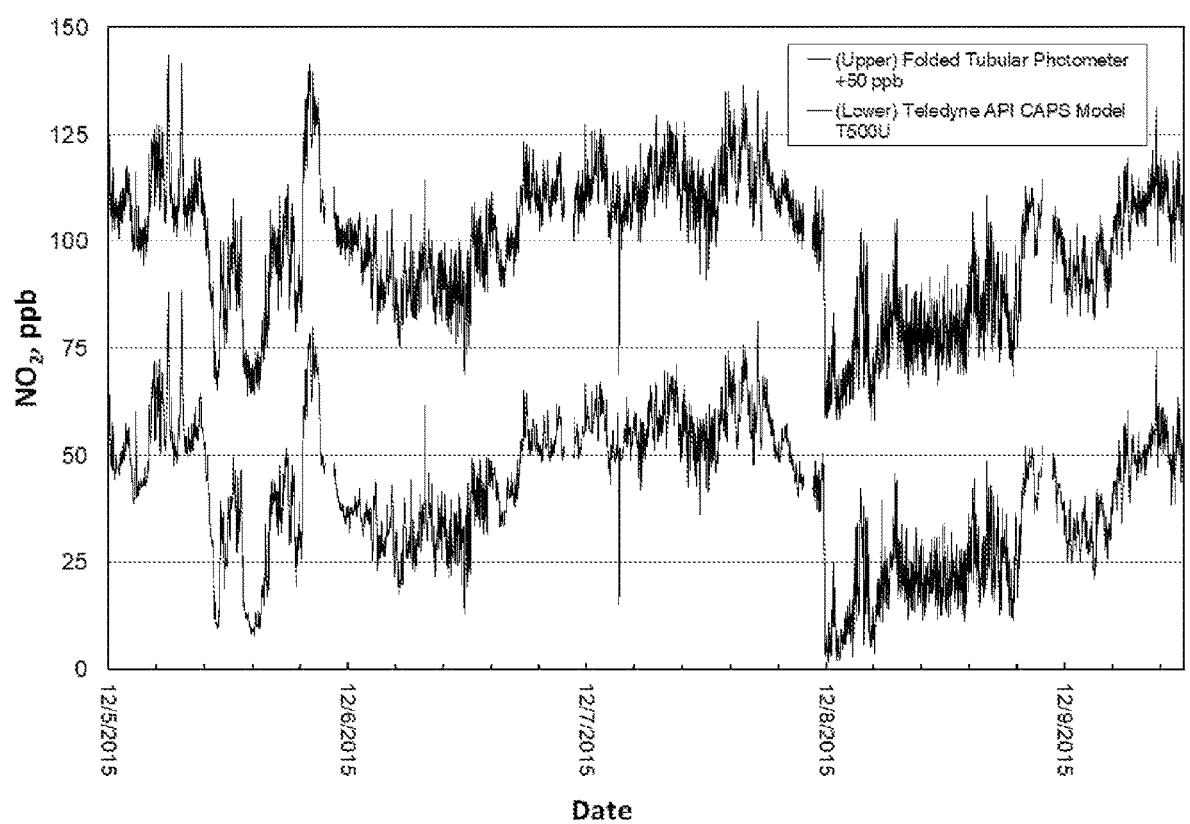
FIG. 6 is a time series comparison plot of ambient $NO_2$ concentration measured outdoors at the Colorado Department of Public Health and Environment (CDPHE) I25-Globeville roadside site using a Teledyne API CAPS Model T500U (lower data line) and a Folded Tubular Photometer (upper data line). Data for the Folded Tubular Photometer are offset for clarity by adding 50 ppb to the measurements.

FIG. 6 compares the one-minute averaged measurements of $NO_2$ mixing ratio using the Folded Tubular Photometer with simultaneous one-minute averaged measurements made by a commercially available Teledyne API CAPS Model T500U. The Folded Tubular Photometer used to obtain the data of FIG. 6 is described by FIG. 1 with the modifications to the input to the optical bench shown in FIG. 3, thereby allowing measurements of both $NO_2$ and NO. In this example, the light source, housed in light source module 110, is an LED having an emission centered at 405 nm with a full width half maximum (FWHM) bandwidth of 30 nm. A photodiode, housed in light detector module 109, serves as the light detector. Six tubular detection cells 106 (four of length 31.75 cm and two of length 26.0 cm) configured as shown in FIG. 2, provide a total optical path length of 208 cm, including the paths between mirrors 119 in the five mirror modules 108. The light is passed through a bandpass filter (centered at 400 nm, bandwidth of 50 nm) to eliminate small amounts of red light emission from the LED, and then detected using the photodiode.

For measurements of $NO_2$ and NO, solenoid valve settings are switched in accordance with FIG. 3, beginning with 5 seconds of duration for valve configuration a during which sample air bypasses the zeroing scrubber 101, passes through $NO_x$ scrubber 104, bypasses the reaction coil 125, passes through the SPTFE water vapor equilibrator 105 and enters the optical bench. The light intensity $I_o$ is measured for $NO_2$ during the final 2 s of this valve configuration.

At the end of the 5-s period of valve configuration a, valve 103 is switched to form valve configuration b in which the sample air bypasses the $NO_x$ scrubber for a period of 5 s. During the final 2 s of this valve configuration, the light intensity is measured and serves as the measure of I for $NO_2$ and $I_o$ for NO. A concentration of $NO_2$ is computed based on the Beer-Lambert Law (equation 1) and output in various ways (display, serial port, USB port, data logger, analog voltage or current, etc.).

At the end of the 5-second duration of valve configuration b, the valve configuration is switched to that of c. To do this, valve 124 is switched with the result that air entering $NO_x$ scrubber 121 passes through the photochemical ozone source 123 to create ozonized air, and valve 126 also is switched, causing the confluence of sample air and ozonized air to pass through reaction coil 125. The reaction coil provides enough residence time (~1 s) for nearly all of the NO in the sample air to react with the ~8 ppm of ozone to produce $NO_2$. During the final 2 s of this valve configuration, the light intensity is measured and serves as the measure of I for NO. Note that at this point in time the light intensity is being attenuated by both the original $NO_2$ in the sample and the $NO_2$ formed from reaction of NO with ozone. By using the light intensity measured near the end of valve configuration b as 1 (where only the original $NO_2$ is present), the Beer-Lambert Law yields a measurement of NO only. Thus, at this point, a value of NO can be computed and output. Next, valves are switched back to configuration a, and the process is repeated. Each time a new $I_o$ or I value is measured (in this case every 5 s), a new value for NO and/or $NO_2$ can be computed and output.

Measurements were made at the I25-Globeville roadside monitoring site operated by the Colorado Department of Public Health and Environment where the elevation is ~5,206 ft (1.6 km) above sea level and ambient pressure is ~0.83 atmospheres. Air was sampled into the instrument at a flow rate of 1.6 L/min, and air entered the $NO_x$ scrubber 121 at a flow rate of 70 cm$^3$/min, resulting in a dilution factor of $NO_2$ (and NO) of 1.04. Averaged data for the Folded Tubular Photometer plotted in FIG. 6 is offset by adding 50 ppb for comparison purposes. The agreement between the two data series is excellent, with both data sets capturing the same sharp changes in concentration due to passing vehicles.

Figure 7:
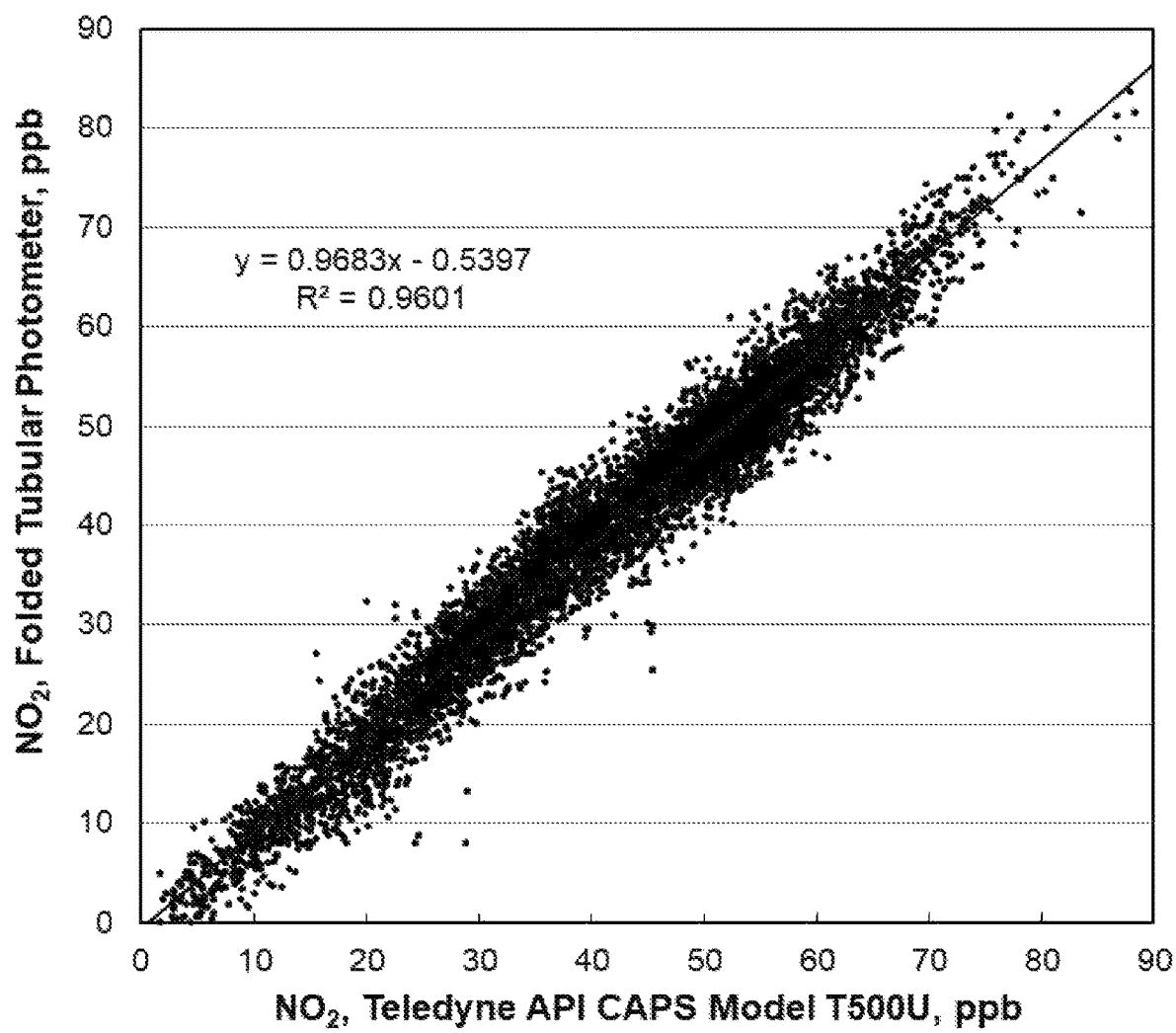
FIG. 7 is a plot of measurements of $NO_2$ made by a Folded Tubular Photometer vs. measurements made by the Teledyne API CAPS Model T500U $NO_2$ Monitor at the CDPHE I25-Globeville site. These are the same data as those plotted as a time series in FIG. 6.

FIG. 7 is a plot of one-minute averaged $NO_2$ concentrations measured by the Folded Tubular Photometer vs. those made simultaneously by a Teledyne API CAPS Model T500U $NO_2$ Monitor. These data are the same as those given in the time series of FIG. 6. The linear regression line shown on FIG. 7 has a slope of 0.97, intercept of ~0.5 ppb and a coefficient of correlation ($R^2$) of 0.96, in good agreement with an ideal slope of 1.00 and intercept of 0 ppb. The slight differences may be accounted for by slight location and timing differences in sampling of air plumes by the two instruments. Small sensitivity and offset calibration factors would bring the two methods into complete agreement on average.

Example 2: Roadside Measurements of Ambient Levels of NO

Figure 8:
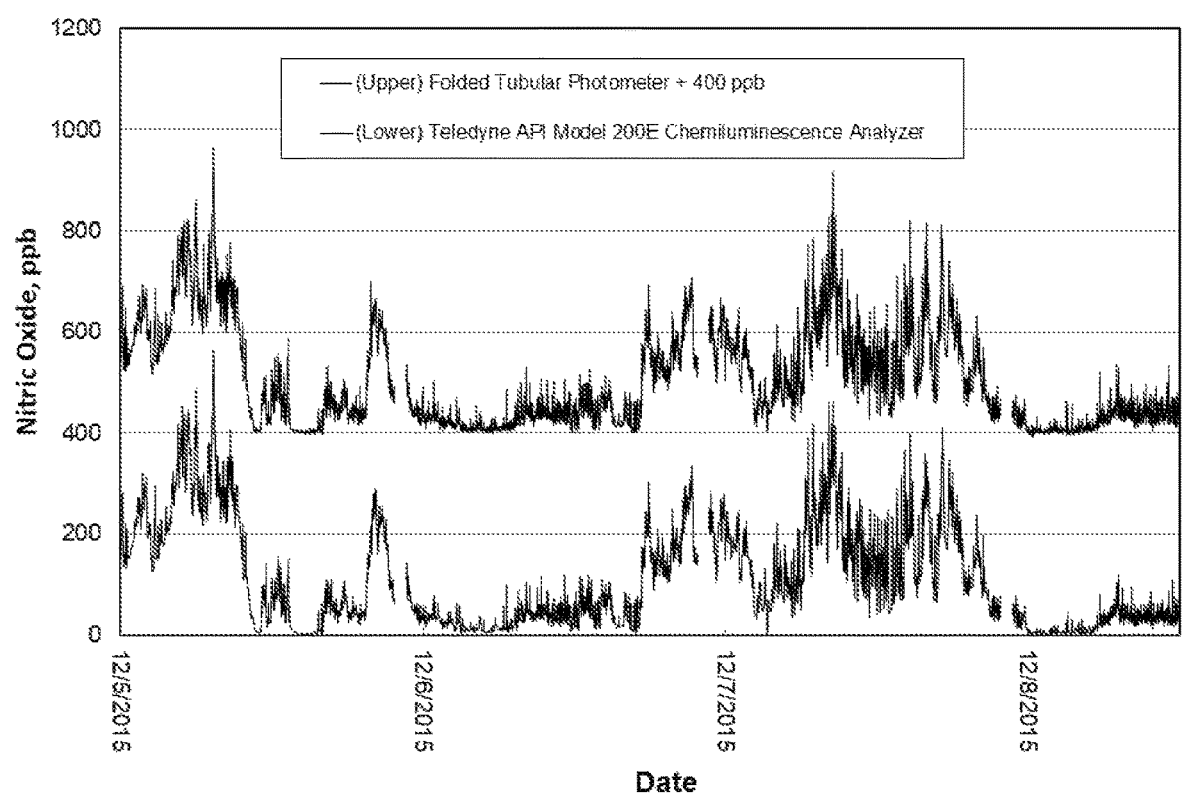
FIG. 8 is a time series comparison plot of ambient NO concentration measured outdoors at the CDPHE I25-Globeville roadside site using a Teledyne API Model 200E Chemiluminescence Analyzer (lower data line) and a Folded Tubular Photometer (upper data line). Data for the Folded Tubular Photometer are offset for clarity by adding 400 ppb to the measurements.

FIG. 8 compares the one-minute averaged measurements of NO mixing ratio using the Folded Tubular Photometer with simultaneous one-minute averaged measurements made by a commercially available Teledyne API Model 200E Chemiluminescence Analyzer. The method used by this analyzer, detection of chemiluminescence in the reaction of NO with a large excess of ozone (Fontijn et al., 1970), is the most common method used for ambient air measurements of nitric oxide. The data of FIG. 8 were obtained simultaneously with the measurements of $NO_2$ shown in FIGS. 6 and 7, at the I25-Globeville roadside monitoring site as described above. Data for the Folded Tubular Photometer are shifted in FIG. 8 by addition of 400 ppb for clarity. The agreement among the two measurement methods is seen to be excellent.

Figure 9:
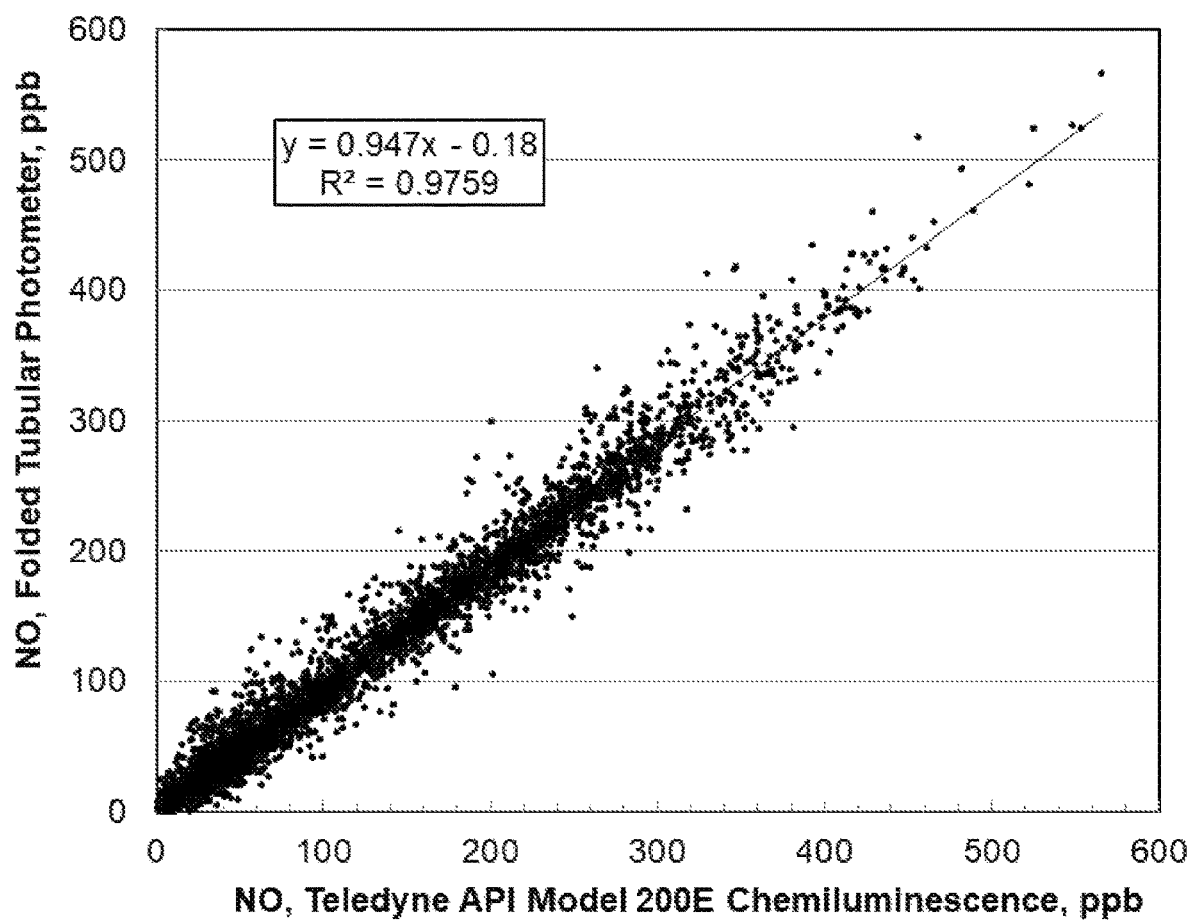
FIG. 9 is a plot of measurements of NO made by a Folded Tubular Photometer vs. measurements made by the Teledyne API Model 200E Chemiluminescence Analyzer. These are the same data as those plotted as a time series in FIG. 8.

FIG. 9 is a plot of one-minute averaged NO concentrations measured by the Folded Tubular Photometer vs. those made simultaneously by a Teledyne API Model 200E Chemiluminescence Analyzer. These data are the same as those given as a time series in FIG. 8. The linear regression line shown on the graph has a slope of 0.95, intercept of ~0.2 ppb and a coefficient of correlation ($R^2$) of 0.98, in good agreement with an ideal slope of 1.00 and intercept of 0 ppb. The slight differences can be accounted for by slight location and timing differences in sampling of air plumes by the two instruments. Small sensitivity and offset calibration factors would bring the two methods into complete agreement on average.

Example 3: Roadside Measurements of Black Carbon

Figure 10:
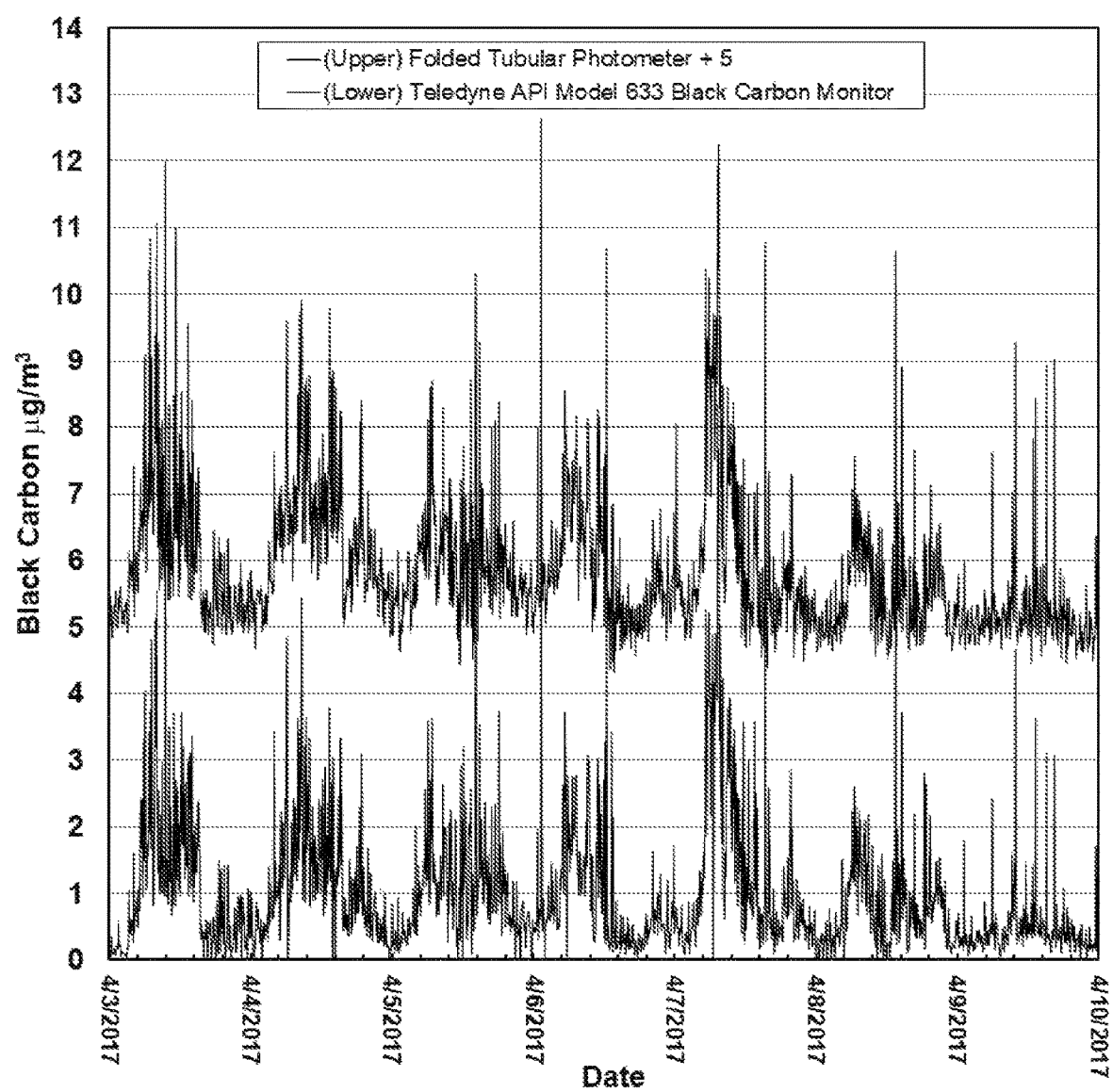
FIG. 10 is a time series comparison plot of ambient black carbon concentration measured outdoors at the CDPHE I25-Denver roadside site using a Teledyne API Model 633 Black Carbon Monitor (lower data line) and a Folded Tubular Photometer (upper data line). Data for the Folded Tubular Photometer are offset for clarity by adding 5 $\mu g/m^3$ to the measurements. Extinction measurements made by the Folded Tubular Photometer were converted to black carbon concentrations in $\mu g/m^3$ by using an extinction coefficient of 6.66 $m^2/g$ and correcting for a positive offset of 1 $\mu g/m^3$, using the data of FIG. 11 below as a calibration.

FIG. 10 compares the five-minute averaged measurements of black carbon using the Folded Tubular Photometer with simultaneous five-minute averaged measurements made by a commercially available aethalometer, a Teledyne API Model 633 Black Carbon Monitor. Measurements were made at the I25-Denver roadside monitoring site operated by the Colorado Department of Public Health and Environment. For these measurements the Folded Tubular Photometer was modified by removing particle filter 100 to allow passage of particles, and replacing scrubbers 101 and 104 with particle filters. Measured light extinctions using the Folded Tubular Photometer in units of mega reciprocal meters ($Mm^{-1}$) were converted to concentrations in $\mu g/m^3$ using a value of 6.66 $m^2/g$ obtained from the regression line of FIG. 11 and correction was made for a positive 1 $\mu g/m^3$ offset. The time series data for the Folded Tubular Photometer are shifted in FIG. 10 by addition of 5 $\mu g/m^3$ for clarity.

Figure 11:
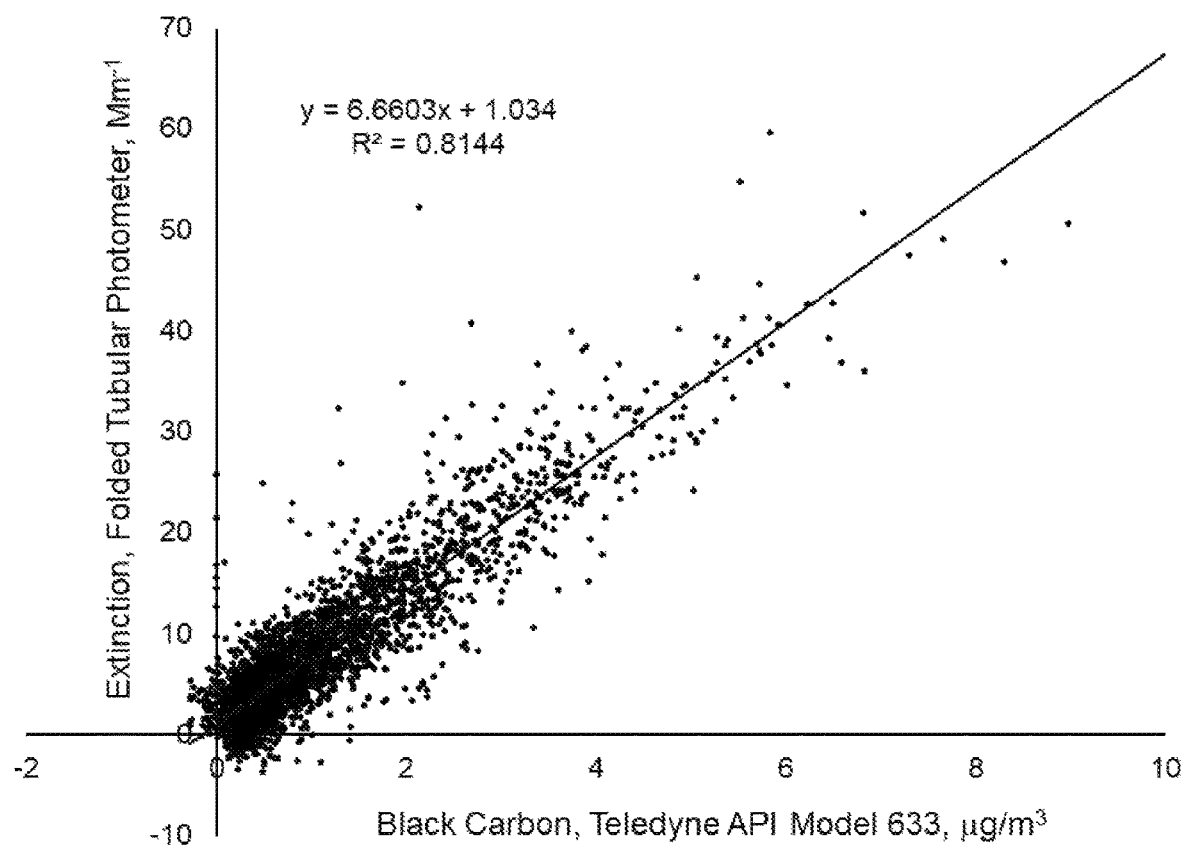
FIG. 11 is a plot of aerosol extinction at 870 nm measured by a Folded Tubular Photometer vs. black carbon measurement made simultaneously by a Teledyne API Model 633 black carbon aethalometer at the CDPHE I25-Denver. These are the same data as those plotted as a time series in FIG. 10.

FIG. 11 is a plot of five-minute averages of black carbon extinction in units of $Mm^{-1}$, calculated as $1/l \ln(I_o/I)$ where l is the path length of 0.21 m, measured by the Folded Tubular Photometer vs. simultaneous five-minute averages of measurements of black carbon concentration in units of $\mu g/m^3$ made simultaneously by a Teledyne API Model 633 Black Carbon Monitor. These data are the same as those given as a time series in FIG. 10. The linear regression line shown on the graph has a slope of 6.66 $m^2/g$, intercept of $-0.2$ $Mm^{-1}$ and a coefficient of correlation ($R^2$) of 0.81. The weaker correlation for black carbon measurements as compared to measurements of $NO_2$ and NO is likely due to particles being less well mixed in the roadside environment, since various passing vehicles have a much larger range of black carbon emissions. Therefore, location and timing differences in sampling by the two instruments have larger effects. Also, perfect agreement between direct measurements of extinction in the gas phase with measurements made by aethalometers is not expected because of known artefacts associated with collection of particles on filters in the aethalometer technique used by the Teledyne API instrument, and differing contributions from aerosol scattering in the two techniques (Coen et al., 2010).

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification. Some references provided herein are incorporated by reference herein to provide details concerning additional starting materials, additional methods of synthesis, additional methods of analysis, and additional uses of the invention.

CITED LITERATURE

Arnott, W. P., K. Hamasha, H. Moosmüller, P. J. Sheridan, and J. A. Ogren (2005) "Towards aerosol light-absorption measurements with a 7-wavelength aethalometer: Evaluation with a photoacoustic instrument and 3-wavelength nephelometer," *Aerosols Science and Technology* 39, 17-29.

Baumgardner, D., O. Popovicheva, J. Allan, V. Bernardoni, J. Cao, F. Cavalli, J. Cozic, E. Diapouli, K. Eleftheriadis, P. J. Genberg, C. Gonzalez, M. Gysel, A. John, T. W. Kirchstetter, T. A. J. Kuhlbusch, M. Laborde, D. Lack, T. Müller, R. Niessner, A. Petzold, A. Piazzalunga, J. P. Putaud, J. Schwarz, P. Sheridan, R. Subramanian, E. Swietlicki, G. Valli, R. Vecchi, and M. Viana (2012) "Soot reference materials for instrument calibration and intercomparisons: A workshop summary with recommendations," *Atmospheric Measurement Techniques* 5, 1869-1887.

Birks, J. W., B. Shoemaker, T. J. Leck, and D. M. Hinton (1976) "Studies of reactions of importance in the stratosphere. I. Reaction of nitric oxide with ozone," *Journal of Chemical Physics* 65, 5181-5185.

Birks, J. W. (1998) "Oxidant formation in the troposphere," In *Perspectives in Environmental Chemistry*, D. L. Macalady, Ed., Oxford University Press, pp. 233-256 (1998).

Bond, T. and R. W. Bergstrom (2006) "Light Absorption by carbonaceous particles: An investigative review," *Aerosol Science and Technology* 40, 27-67.

Borders, R. A. and J. W. Birks (1982) "High precision measurements of activation energies over small temperature intervals: Curvature in the Arrhenius plot for the reaction $NO+O_3 \rightarrow NO_2+O_2$," *Journal of Physical Chemistry* 86, 3295-3302.

Buhr, M. P. (2007) "Solid-state light source photolytic nitrogen dioxide converter," U.S. Pat. No. 7,238,328.

Burkholder, J. B., S. P. Sander, J. Abbatt, J. R. Barker, R. E. Huie, C. E. Kolb, M. J. Kurylo, V. L. Orkin, D. M. Wilmouth, and P. H. Wine: Chemical Kinetics and Photochemical Data for Use in Atmospheric Studies, Evaluation No. 18, JPL Publication 15-10, Jet Propulsion Laboratory, Pasadena, 2015.

Burrows, J. P., A. Dehn, B. Deters, S. Himmelmann, A. Richter, S. Voigt, and J. Orphal, (1998) "Atmospheric remote-sensing reference data from GOME: Part 1. Temperature-dependent absorption cross-sections of $NO_2$ in the 231-794 nm range," *Journal of Quantitative Spectroscopy and Radiative Transfer* 60, 1025-1031.

Coen, M. C., E. Weingartner, A. Apituley, D. Ceburnis, R. Fierz-Schmidhauser, H. Flentje, J. S. Henzing, S. G. Jennings, M. Moerman, A. Petzold, O. Schmid, and U. Baltensperger (2010) "Minimizing light absorption measurement artifacts of the Aethalometer: Evaluation of five correction algorithms," *Atmospheric Measurement Techniques* 3, 457-474.

Daube, B. C., A. E. Boering, A. E. Andrews, and S. C. Wofsy (2002) "A high-precision fast response airborne $CO_2$ analyzer for in situ sampling from the surface to the middle stratosphere," *Journal of Atmospheric and Oceanic Technology* 19, 1532-1543.

Fontijn, A., A. J. Sabadell, and R. J. Ronco (1970) "Homogenous chemiluminescent measurement of nitric oxide with ozone," *Analytical Chemistry* 42, 575-579.

Hansen, A. D. A., H. Rosen, and T. Novakov (1982) "Real-time measurement of the aerosol absorption-coefficient of aerosol particles," *Applied Optics* 21, 3060-3062.

Herriott, D. and H. Schulte (1965) "Folded optical delay lines," *Applied Optics* 4, 883-889.

Janssen, N. A. H., M. E. Gerlos-Nijland, T. Lanki, R. O. Salonen, F. Cassee, G. Hoek, P. Fischer, B. Brunekreef, and M. Krzyzanowski (2012) *Health Effects of Black Carbon*, World Health Organization Regional Office for Europe, 87 pp.

Kalnajs, L. E. and L. M. Avallone (2010) "A novel lightweight low-power dual-beam ozone photometer utilizing solid-state optoelectronics," *Journal of Atmospheric and Oceanic Technology* 27, 869-880.

Kebabian, P. L., S. C. Herndon, and A. Freedman (2005) "Detection of nitrogen dioxide by cavity attenuated phase shift spectroscopy," *Analytical Chemistry* 77, 724-728.

Ramanathan, V. (2007) Testimony for the Hearing on Black Carbon and Climate Change, U.S. House Committee on Oversight and Government Reform 4, 18 Oct. 2007.

Schwarz, F. P., H. Okabe, and J. K. Whittaker (1974) "Fluorescence detection of sulfur dioxide in air at the parts per billion level," *Analytical Chemistry* 46, 1024-1028.

Vandaele, A. C., P. C. Simon, J. M. Guilmot, M. Carleer, and R. Colin (1994) "$SO_2$ absorption cross section measurement in the UV using a Fourier transform spectrometer," *Journal of Geophysical Research* 99, 25599-25605.

Weingartner, E., H. Saathoff, M. Schnaiter, N. Streit, B. Bitnar, and U. Baltensperger (2003) "Absorption of light by soot particles: Determination of the absorption coefficients by means of aethalometers," *Journal of Aerosol Science* 34, 1445-1463.

White, J. U. (1942) "Long optical paths of large aperture," *Journal of the Optical Society of America* 32, 285-288.

Wilson, K. L. and J. W. Birks, "Mechanism and elimination of a water vapor interference in the measurement of ozone by UV absorbance (2006) *Environmental Science and Technology* 40, 6361-6367.

Winer, A. M., J. W. Peters, J. P. Smith, and J. N. Pitts (1974) "Response of commercial chemiluminescent $NO$—$NO_2$ analyzers to other nitrogen-containing compounds, *Environmental Science and Technology* 8, 1118-1121.

The invention claimed is:

1. A method for measuring the concentration of one or more gaseous or particle analytes in a sample gas, the method comprising the steps:

drawing the sample gas into a folded tubular photometer at a flow rate via an air pump, the folded tubular photometer comprising an analyte scrubber or filter, a detection cell, and at least one element to equalize the pressure inside the detection cell during the measurement of the one or more gaseous or particle analytes; the analyte scrubber or filter arranged upstream from the detection cell and configured to remove the one or more gaseous or particle analytes from the sample gas; the detection cell comprising a plurality of tubes through which the sample gas passes and which form an optical path between one or more light sources which emit light at wavelengths absorbed by the one or more gaseous or particle analytes and a light detector which measures light intensity; the optical path folded by one or more reflective elements which redirect light emitted from the one or more light sources through each of the plurality of tubes;

selectively directing the sample gas to either pass through the analyte scrubber or filter during an $I_o$ measurement cycle, or bypass the analyte scrubber or filter during an I measurement cycle, each of the $I_o$ measurement cycle and the I measurement cycle lasting for a set time period, the set time period long enough to allow the sample gas to be substantially flushed from the detection cell and to allow a signal averaging time that achieves a desired precision in the measured concentration of the one or more gaseous or particle analytes;

making a light intensity measurement $I_o$ during a latter portion of the $I_o$ measurement cycle after the detection cell has been substantially flushed of the sample gas from a preceding I measurement cycle, or a light intensity measurement I during a latter portion of the I measurement cycle after the detection cell has been substantially flushed of the sample gas from a preceding $I_o$ measurement cycle;

selectively redirecting the sample gas to either bypass the analyte scrubber or filter at the end of the $I_o$ measurement cycle thereby beginning the I measurement cycle, or pass through the analyte scrubber or filter at the end of the I measurement cycle thereby beginning the $I_o$ measurement cycle;

equalizing the pressure inside the detection cell within a range of approximately 0.1 mbar when the light intensity measurement $I_o$ and the light intensity measurement I are made;

quantifying the concentration of the one or more gaseous or particle analytes in the sample gas using the Beer-Lambert Law, the light intensity measurement $I_o$ and the light intensity measurement I.

2. The method of claim 1, wherein the optical path of the detection cell is formed by the plurality of tubes and the one or more reflective elements, the one or more reflective elements formed by one or more mirror modules containing one or more mirrors which redirect light emitted from the one or more light sources to the light detector, the plurality of tubes and the one or more mirror modules connected by airtight seals along the optical path.

3. The method of claim 1, wherein the pressure inside the detection cell is equalized by introducing a variable airflow into the sample gas downstream from the detection cell, the variable airflow being controlled by a feedback loop.

4. The method of claim 1, wherein the pressure inside the detection cell is equalized by variable restriction of the sample gas at a point upstream or downstream from the detection cell, the variable restriction being controlled by a feedback loop.

5. The method of claim 1, wherein the pressure inside the detection cell is equalized by an inlet pump and an overflow tee upstream from the detection cell.

6. The method of claim 1, wherein the one or more gaseous or particle analytes is $NO_2$, $O_3$, $SO_2$ or black carbon.

7. The method of claim 1, wherein NO in the sample gas is converted to $NO_2$ by reaction with ozone prior to entering the optical path.

8. A method for measuring the concentration of $NO_2$ in a sample gas using a folded tubular photometer comprising a detection cell, at least one element to equalize the pressure inside the detection cell during the $NO_2$ measurement, and a $NO_2$ scrubber following a sample gas inlet, the $NO_2$ scrubber arranged upstream from the detection cell and configured to remove $NO_2$ from the sample gas, the detection cell comprising a plurality of tubes and one or more mirror modules forming a folded optical path between a light source which emits light at wavelengths that are absorbed by $NO_2$ and a light detector which measures light intensity, the method comprising the steps of:
  drawing the sample gas into the folded tubular photometer at a flow rate via an air pump;
  in a first valve configuration, directing the sample gas to pass through the $NO_2$ scrubber resulting in a scrubbed sample gas, flowing the scrubbed sample gas into the detection cell, and measuring a light intensity $I_o$ for $NO_2$;
  switching between the first valve configuration and a second valve configuration;
  in the second valve configuration, directing the sample gas to bypass the $NO_2$ scrubber resulting in an unscrubbed sample gas, flowing the unscrubbed sample gas into the detection cell, and measuring a light intensity I for $NO_2$;
  the first and second valve configurations each lasting for a set time period, the set time period long enough to allow the scrubbed sample gas or unscrubbed sample gas to be substantially flushed from the detection cell and to allow a signal averaging time that achieves a desired precision in the measured concentration of the $NO_2$;
  light intensity $I_o$ being measured during a latter portion of the first valve configuration after the detection cell has been substantially flushed of the unscrubbed sample gas from a preceding measurement of light intensity I, and light intensity I being measured during a latter portion of the second valve configuration after the detection cell has been substantially flushed of the scrubbed sample gas from a preceding measurement of light intensity $I_o$;
  equalizing the pressure inside the detection cell within a range of approximately 0.1 mbar when the measurements of light intensity I and light intensity $I_o$ are made;
  quantifying the concentration of $NO_2$ in the sample gas using the Beer-Lambert Law and the measurements of light intensity $I_o$ for $NO_2$ and light intensity I for $NO_2$.

9. The method of claim 8, wherein the light source has a maximum emission wavelength near 405 nm.

10. The method of claim 8, wherein the pressure inside the detection cell is equalized by admitting a variable air flow at a point downstream from the detection cell, the variable airflow being controlled by a feedback loop.

11. The method of claim 8, wherein the pressure inside the detection cell is equalized by variable restriction of the sample gas at a point upstream or downstream from the detection cell, the variable restriction being controlled by a feedback loop.

12. The method of claim 8, wherein the pressure inside the detection cell is equalized by an inlet pump and an overflow tee upstream from the detection cell.

13. The method of claim 8, wherein NO in the sample gas is converted to $NO_2$ by reaction with ozone prior to entering the detection cell.

14. A method for measuring optical extinction by particles in a sample gas, the method comprising the steps:
  drawing the sample gas into a folded tubular photometer at a flow rate via an air pump, the folded tubular photometer comprising a particle filter, a detection cell, and at least one element to equalize the pressure inside the detection cell during light intensity measurements, the particle filter arranged upstream from the detection cell and configured to remove particles from the sample gas, the detection cell comprising a plurality of tubes through which the sample gas passes, the plurality of tubes forming an optical path between at least one light source which emit light at one or more wavelengths absorbed or scattered by some fraction of the particles and a light detector which measures light intensity at the one or more wavelengths; the optical path being folded by at least one mirror module containing one or more mirrors which redirect a light beam emitted from the at least one light source through the plurality of tubes, the at least one mirror module forming gas-tight seals with adjacent tubes of the plurality of tubes;
  in a first valve configuration, directing the sample gas to pass through the particle filter resulting in a scrubbed sample gas, flowing the scrubbed sample gas mixture into the detection cell, and measuring a light intensity $I_o$ at the one or more wavelengths;
  switching between the first valve configuration and a second valve configuration;
  in the second valve configuration, directing the sample gas to bypass the particle filter resulting in an unscrubbed sample gas, flowing the unscrubbed sample gas into the detection cell, and measuring a light intensity I at the one or more wavelengths;
  the first and second valve configurations each lasting for a set time period, the set time period long enough to allow the scrubbed sample gas or unscrubbed sample gas to be substantially flushed from the detection cell and to allow a signal averaging time that achieves a desired precision in the measured concentration of the particles;
  light intensity $I_o$ being measured during a latter portion of the first valve configuration after the detection cell has been substantially flushed of the unscrubbed sample gas from a preceding measurement of light intensity I, and light intensity I being measured during a latter portion of the second valve configuration after the detection cell has been substantially flushed of the scrubbed sample gas from a preceding measurement of light intensity $I_o$;
  equalizing the pressure inside the detection cell within a range of approximately 0.1 mbar when the measurements of light intensity I and light intensity $I_o$ are made;
  quantifying the concentration of particles in the sample gas using the Beer-Lambert Law and the measurements of light intensity $I_o$ and light intensity I at the one or more wavelengths.

15. The method of claim 14, wherein the light source emits light at wavelengths in the visible or near infrared to quantify the concentration of black carbon.

16. The method of claim 14, wherein the light source emits light at wavelengths in the ultraviolet to provide an estimate of the concentration of brown carbon.

17. The method of claim 14, wherein the light source has a maximum emission intensity at a wavelength at or near 880 nanometers.

18. The method of claim 14, wherein the at least one light source comprises two or more light sources, the two or more light sources having different wavelengths at maximum emission intensity.

19. The method of claim 14, wherein the pressure inside the detection cell is equalized by admitting a variable airflow at a point after the sample gas exits the detection cell, the variable airflow being controlled by a feedback loop.

20. The method of claim 14, wherein the pressure inside the detection cell is equalized by a variable restriction of the sample gas at a point upstream or downstream from the detection cell, the variable restriction being controlled by a feedback loop.

* * * * *